(12) United States Patent
Sarwat et al.

(10) Patent No.: US 11,022,720 B2
(45) Date of Patent: Jun. 1, 2021

(54) SYSTEM FOR FORECASTING RENEWABLE ENERGY GENERATION

(71) Applicants: Arif I. Sarwat, Miami, FL (US); Aditya Sundararajan, Miami, FL (US); Hugo Riggs, Miami, FL (US); Avinash Jeewani, Miami, FL (US); Shahid Tufail, Miami, FL (US)

(72) Inventors: Arif I. Sarwat, Miami, FL (US); Aditya Sundararajan, Miami, FL (US); Hugo Riggs, Miami, FL (US); Avinash Jeewani, Miami, FL (US); Shahid Tufail, Miami, FL (US)

(73) Assignee: The Florid International University Board of Trustees, Miami, FL (US)

( * ) Notice: Subject to any disclaimer, the term of this patent is extended or adjusted under 35 U.S.C. 154(b) by 0 days.

(21) Appl. No.: 16/882,010

(22) Filed: May 22, 2020

(65) Prior Publication Data
US 2021/0124089 A1    Apr. 29, 2021

Related U.S. Application Data

(60) Provisional application No. 62/926,194, filed on Oct. 25, 2019.

(51) Int. Cl.
| | |
|---|---|
| *G01W 1/10* | (2006.01) |
| *G06K 9/00* | (2006.01) |
| *H02J 3/00* | (2006.01) |
| *G06N 3/04* | (2006.01) |
| *H02J 3/38* | (2006.01) |
| *G06N 3/08* | (2006.01) |
| *G01W 1/06* | (2006.01) |

(52) U.S. Cl.
CPC ............ *G01W 1/10* (2013.01); *G01W 1/06* (2013.01); *G06K 9/0063* (2013.01); *G06N 3/04* (2013.01); *G06N 3/08* (2013.01); *H02J 3/004* (2020.01); *H02J 3/381* (2013.01); *G01W 2203/00* (2013.01); *H02J 2300/24* (2020.01)

(58) Field of Classification Search
CPC ..... G01W 1/10; G01W 1/06; G01W 2203/00; G06K 9/0063; H02J 3/381; H02J 3/004; H02J 2300/24; G06N 3/08; G06N 3/04
USPC .......................................................... 702/3
See application file for complete search history.

(56) References Cited

U.S. PATENT DOCUMENTS

| | | | | |
|---|---|---|---|---|
| 2017/0104449 A1* | 4/2017 | Drees | ...................... | H02S 50/00 |
| 2019/0064392 A1* | 2/2019 | Feng | ...................... | H02J 3/381 |

OTHER PUBLICATIONS

Colak, Multi-Period Prediction of Solar Radiation Using ARM and ARIMA Models (Year: 2015).*
Sfetsos, Univariate and Multivariate forecasting of hourly solar radiation with artificial intelligence techniques (Year: 1999).*

* cited by examiner

*Primary Examiner* — Michael P Nghiem
*Assistant Examiner* — Dacthang P Ngo
(74) *Attorney, Agent, or Firm* — Saliwanchik, Lloyd & Eisenschenk

(57) ABSTRACT

Systems and methods for forecasting renewable energy generation using holistic weather and system analysis are provided. Derate factors of energy sources can be considered, along with regional weather variability, site specific weather, and a cross-view of the sky from ground based and/or geo-stationary satellite imaging. The forecast can include short-term forecasting and long-term forecasting.

20 Claims, 30 Drawing Sheets

SYSTEM FOR FORECASTING RENEWABLE ENERGY GENERATION

CROSS-REFERENCE TO RELATED APPLICATION

This application claims the benefit of U.S. Provisional Application Ser. No. 62/926,194, filed Oct. 25, 2019, which is hereby incorporated by reference herein in its entirety, including any figures, tables, and drawings.

BACKGROUND

Different variants of the autoregressive integrated moving average (ARIMA) models such as AR(I)MA(X) and SAR(I)MA(X) have been applied to the problem of forecasting, such as in Colak et al. (I. Colak, M. Yesilbudak, N. Genc, and R. Bayindir, "Multi-period prediction of solar radiation using arma and arima models," in 2015 IEEE 14th International Conference on Machine Learning and Applications (ICMLA), pp. 1045-1049, December 2015), in which the authors used forecast horizons of 1, 2, and 3 hours. The mean absolute percentage error (MAPE) was used to assess model performances. In another approach documented in Vagropoulos et al. (S. I. Vagropoulos, G. I. Chouliaras, E. G. Kardakos, C. K. Simoglou, and A. G. Bakirtzis, "Comparison of sarimax, sarima, modified sarima and ann-based mod-els for short-term pv generation forecasting," in 2016 IEEE International Energy Conference (ENERGYCON), pp. 1-6, April 2016), the authors used SARIMAX, SARIMA, modified SARIMA, and neural network-based models for short-term fore-casting. In this, the generation horizon was classified into 4 categories: winter; spring; summer; and autumn. The authors concluded that ANN, SARIMAX, and modified SARIMA are the best models to meet the forecasting needs for winter, spring, and autumn whereas SARIMA performed better for the summer horizon. ARIMA used to forecast global horizontal irradiance has been done by measuring the root mean square error (RMSE) and a coefficient of determination such as R-square. An R-square and RMSE of 88.63% and 72.88, respectively, can be obtained.

In Hassan et al. (M. Z. Hassan, M. E. K. Ali, A. B. M. S. Ali, and J. Kumar, "Forecasting day-ahead solar radiation using machine learning approach," in 2017 4th Asia-Pacific World Congress on Computer Science and Engineering (APWC on CSE), pp. 252-258, December 2017), a day-ahead solar forecasting was done using SVM with different kernels, among which the radial basis function performed the best with an RMSE and mean absolute error (MAE) of 0.580 and 0.728, respectively. ANN has been used to forecast solar irradiance, combined with genetic algorithm to find the optimal array size and position of the solar monitoring station to get the most accurate forecast. Numerical weather prediction and convolutional neural networks have also been used to forecast solar energy. In addition, the probabilistic forecasting of solar power has been done using multiple linear regression, which performs the best on sunny days but reduces in accuracy as the cloud interference with sunlight increases. Short-term forecasting using the Mycielski algorithm can be done where a 60 W solar panel is used as the setup. The authors in Xu et al. (J. Xu, S. Yoo, D. Yu, D. Huang, J. Heiser, and P. Kalb, "Solar irradiance forecasting using multi-layer cloud tracking and numerical weather prediction," in Proceedings of the 30th Annual ACM Symposium on Applied Computing, SAC '15, (New York, N.Y., USA), pp. 2225-2230, ACM, 2015) forecast solar irradiance using cloud motion tracking and numerical weather prediction.

All of these existing approaches have issues that can be improved upon.

BRIEF SUMMARY

Embodiments of the subject invention provide systems and methods for forecasting renewable energy generation (e.g., photovoltaic (PV) energy generation) using holistic weather and system analysis. Derate factors of PV panels can be considered, along with regional weather variability, site specific weather, and a cross-view of the sky from ground based and/or geo-stationary satellite imaging. Gathering weather on multiple gradients enables a more robust model that captures a broad range of system inputs.

In an embodiment, a system for forecasting renewable energy generation (e.g., PV energy generation) can comprise: a processor; and a machine-readable medium (e.g., a (non-transitory) computer-readable medium) in operable communication with the processor and having instructions stored thereon that, when executed by the processor, perform the following steps: receiving energy data on current energy generation from at least one first sensor on a renewable energy source; receiving weather parameters of the local weather from second sensors; receiving image data of the sky from at least one imaging camera; estimating future energy generation based on the energy data and the weather parameters; estimating cloud cover based on the image data to derive a cloud shading profile; performing a univariate regression on the weather parameters and the cloud shading profile to derive input parameters; and performing at least one parametric regression on the input parameters and the energy data and deriving a forecast of renewable energy generation. The forecast of renewable energy generation can comprise a 5-minute ahead prediction, 15-minute ahead prediction, a 1-hour ahead prediction, and/or a 7-day ahead prediction. The system can comprise the at least one first sensor, the second sensors, and/or the at least one imaging camera. The weather parameters can comprise wind speed, wind direction ambient temperature, precipitation, atmosphere turbidity, and/or atmosphere translucency. The instructions when executed by the processor can further receive the image data from a geo-satellite feed. The estimating of the cloud cover based on the image data to derive the cloud shading profile can comprise using a convolutional-time-dependent neural network to derive the cloud shading profile. The instructions when executed by the processor can further receive aggregation data and use the aggregation data when deriving the forecast of renewable energy generation.

In another embodiment, a method for forecasting renewable energy generation (e.g., PV energy generation) can comprise: receiving (e.g., by a processor) energy data on current energy generation from at least one first sensor on a renewable energy source; receiving (e.g., by the processor) weather parameters of the local weather from second sensors; receiving (e.g., by the processor) image data of the sky from at least one imaging camera; estimating (e.g., by the processor) future energy generation based on the energy data and the weather parameters; estimating (e.g., by the processor) cloud cover based on the image data to derive a cloud shading profile; performing (e.g., by the processor) a univariate regression on the weather parameters and the cloud shading profile to derive input parameters; and performing (e.g., by the processor) at least one parametric regression on the input parameters and the energy data and deriving a forecast of renewable energy generation. The forecast of renewable energy generation can comprise a 5-minute ahead prediction, 15-minute ahead prediction, a 1-hour ahead prediction, and/or a 7-day ahead prediction. The weather parameters can comprise wind speed, wind direction ambient temperature, precipitation, atmosphere turbidity, and/or atmosphere translucency. The method can further comprise the image data from a geo-satellite feed. The estimating of the cloud cover based on the image data to derive the cloud shading profile can comprise using a convolutional-time-dependent neural network to derive the cloud shading profile. The method can further comprise receiving aggregation data and using the aggregation data when deriving the forecast of renewable energy generation.

DETAILED DESCRIPTION

Figure 1:
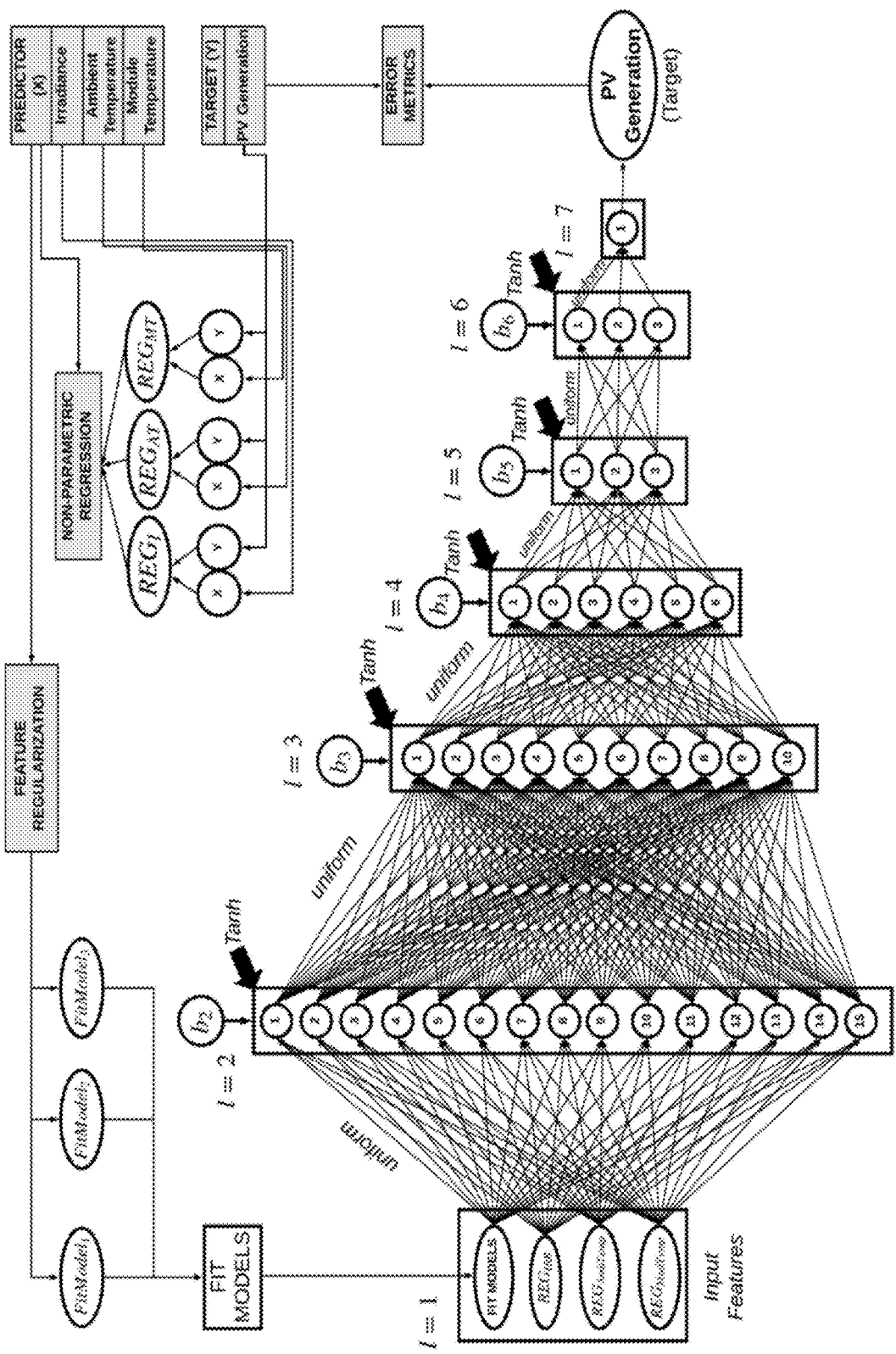
FIG. 1 shows a schematic diagram of a methodology used to make photovoltaic (PV) generation predictions, according to an embodiment of the subject invention.

Embodiments of the subject invention provide novel and advantageous systems and methods for forecasting renewable energy generation (e.g., photovoltaic (PV) energy generation) using holistic weather and system analysis. Derate factors of PV panels can be considered, along with regional weather variability, site specific weather, and a cross-view of the sky from ground based and/or geo-stationary satellite imaging. Gathering weather on multiple gradients enables a more robust model that captures a broad range of system inputs.

Embodiments of the subject invention provide novel and advantageous systems and methods utilizing a unique combinatorial approach using least absolute shrinkage and selection operator (LASSO)-Elastic Net regularizations and multilayer perceptron for PV generation forecasting. A combinatorial model using LASSO-Elastic Net regularizations for feature shrinkage, non-parametric regression can be used to capture dependencies, and a multilayer perceptron (MLP) trained with particle swarm optimization (PSO) can be used to predict PV generation. Such models can reduce the likelihood of overfitting, while improving generalization when compared to using raw inputs.

A linear regression model is generically represented by: $y=\alpha+\beta x+s$, where $\alpha$ denotes the intercept, $\beta$ represents the slope, also called the variable's coefficient, and s the error. $\alpha$ and $\beta$ are together called regression coefficients. Linear regression models are built such that y takes on the PV generation values while x represents weather parameters, considered one at a time. The resulting models, six in total, have been tested for statistical significance using the null hypothesis test.

To reduce overfitting and improve the ordinary least squares estimates of a linear regression model, two types of penalization techniques are used: ridge regularization to minimize the residual sum of squares with respect to the $L_2$ norm of the coefficients that keeps all predictors in the model; and least absolute shrinkage and selection operator (LASSO) regularization to minimize the residual sum of squares contingent on the $L_1$ norm of the coefficients through continuous shrinkage and automatic variable selection. In datasets with high correlation between the predictors, LASSO's variable selection performs poorly. Also, for datasets where the dimensionality, p, is much less when compared to the number of observations n, ridge regularization outperforms LASSO.

An elastic net is a combination of ridge and LASSO regularization techniques that applies an elastic net penalty. Given the tuning parameter $\lambda$ that controls the penalty's magnitude, the model solves the objective function, $F(\bullet)$ defined in Equation (2.1) over its entire grid space. Let f(y, η) denote the negative log-likelihood function for the $i^{th}$ record. If the response is of type Gaussian, then $f(y, η)=(y-η)^2$. The variable α controls the elastic net penalty, with α=0 denoting ridge, α=1 denoting LASSO, and α∈(0, 1) denoting elastic net.

$$F(\cdot) := \min_{\beta_0, \beta} \frac{1}{N} \sum_{i=1}^{N} w_i f(y_i, \beta_0 + \beta^T x_i) + \lambda[(1-\alpha)\|\beta\|_2^2 + \alpha\|\beta\|_1] \quad (2.1)$$

| Algorithm 1 K-fold Cross Validation Method |
| --- |
| 1: Define the number of folds or subsets, K |
| 2: Define the dataset ($x_{train}$, $y_{train}$) |
| 3: for k in 1 : K do |
| 4:     predictors$_{train}$ := Split $x_{train}$ into k and K-k subsets, respectively |
| 5:     target$_{train}$ := Split $y_{train}$ into k and K-k subsets, respectively |
| 6:     model := F(·) defined in Eq. (2.1) with MSE as loss function |
| 7:     Define val$_{error}$ $[0]_{n \times K}$; val$_{error}$ ∈ $\mathbb{R}^+$; n is number of samples in target$_{train}$ |
| 8:     predicted$_{error}$ := model(target$_{train}$, . . . ) |
| 9:     val$_{error}$ := Error between predicted$_{error}$ and target$_{train}$ |
| 10:     Compute the mean absolute error from val$_{error}$ to give a 1 × K vector |
| 11: Compute average of K entries in val$_{error}$ to give a single value |
| 12: Return |

A K-fold cross-validation with K=10 is also used to train the regression model with step-wise α values (from 0 to 1 in steps of 0.1) to determine the cross-validated model(s) with the least MSE. The K-fold cross-validation for an input matrix of $x_{train}$ and target vector of $y_{train}$ is outlined in Algorithm 1.

MLPs are the neural networks in which the connections between the neurons across layers are unidirectional and not cyclic. An MLP model can be used to predict PV generation using forecasts of weather as features. In the former case, the model is trained using backpropagation with adaptive learning rate and momentum, whereas in the latter case, it is trained using particle swarm optimization (PSO). MLP is one of the simplest feed forward neural networks that comprises one or more hidden layers, an input layer, and an output layer.

| Algorithm 2 Holdout Method for Validation |
| --- |
| 1: [train, test] := Split dataset $\hat{\chi}_{observed}$ through random assignment of cases |
| 2: Define val$_{error}$ $[0]_{m \times 1}$, where val$_{error}$ ∈ $\mathbb{R}^+$ and m is the number of samples in test |
| 3: model := f(train, . . . ), where f(·) is the function approximator and . . . are additional arguments |
| 4: [$\hat{\chi}_{predicted}$, val$_{error}$] := model(test, . . . ) |
| 5: Compute the mean absolute error from val$_{error}$ |
| 6: Evaluate model using the mean absolute error of val$_{error}$ |
| 7: Return model |

| Algorithm 3 Particle Swarm Optimization to Train MLP model |
| --- |
| 1: [train,test] := Split $\hat{X}_{observed}$ |
| 2: Define the number of particles P, total number of weights w |
| 3: Initialize w weights for P particles using uniform distribution |
| 4: Assign weight and bias values to each layer in model |
| 5: Initialize global best position posbest$_{global}$ |
| 6: for p in 1 : P do |
| 7:     Initialize position pos and velocity v |
| 8:     Initialize best position posbest$_p$ |
| 9:     Define loss function, mean square error, $\mathcal{L}(\cdot)$ and objective function to minimize it |
| 10:     model := f (train, w, P, pos, v, posbest$_p$, posbest$_{global}$) |
| 11: for i in iter do |
| 12:     for p in 1 : P do |
| 13:         v := w × v + 1.5 × rand(·)(posbest$_p$ − pos) + 1.5 × rand(·)(posbest$_{global}$ − pos) |
| 14:     for p in 1 : P do |
| 15:         pos := pos + v |
| 16:         Update posbest$_{global}$ if posbest$_p$ for particle p < posbest$_{global}$ |
| 17:     for p in 1 : P do |
| 18:         Compute the minimized loss function $\mathcal{L}(\cdot)$ using updated values |
| 19:     model := f (train, w, P, pos, v, posbest$_p$, posbest$_{global}$, $\mathcal{L}(\cdot)$) |
| 20: Return model, which is now trained |

In an particular embodiment, the MLP model can have 6 layers, with 3, 16, 12, 8, 4, and 1 units, respectively. The dataset can be split into a training:development:testing ratio of 8:1:1, and the validation can be done using the holdout method (Algorithm 2). This model uses PSO, described in Algorithm 3, for training and updating its weights.

PSO is an evolutionary optimization that simulates the behavior of bird flocks to share information. The swarm comprises a set of particles, denoted by P, each of which (p) has its own best-achieved position (posbest$_p$) and a best position achieved by the entire swarm (posbest$_{global}$). Each particle has a current position vector, pos, and a velocity vector, v. The weight update involves modifying the pos and v values per particle per iteration (i) and minimizing the loss function (mean square error, denoted by L(•)). The trained model is obtained by applying the function approximator f(•) over the train set and updated weights w that make up the final position values for the swarm's particles.

There are standard metrics available to compare the performance of adaptive models. Specific metrics are used for the predictive models. To compare the performance of the proposed model, three metrics can be used. These are the root mean square error (RMSE), mean square error (MSE), and the mean absolute error (MAE) (see, e.g., Frasco (M. Frasco, "Evaluation metrics for machine learning," R Project Documentation on Metrics Package, pp. 1-26, 2018), which is hereby incorporated by reference herein in its entirety). Let $y_i$ denote the $i^{th}$ observation of the observed dataset and $\hat{y}_i$ denote the corresponding observation from the predicted dataset $\forall i \in Z^+$, where i=[1, 2, . . . , n]. Here, n denotes the total number of observations. If $\overline{\cdot}$ denotes the mean of •, the metrics can then be calculated using Equation (2.2).

$$RMSE = \sqrt{\frac{\sum_{i=1}^{n}(\hat{y}_i - y_i)^2}{n}}, \; MSE = (RMSE)^2, \; MAE = \frac{\sum_{i=1}^{n}|\hat{y}_i - y_i|}{n} \quad (2.2)$$

Although utilities use estimation methods to approximate the profiles of PV generation, accurate prediction is required on a day-to-day basis to monitor system behavior and plan for commitment and dispatch. PV generation can be considered a form of time-series data because it follows the diurnal cycles of the sun, and seasonal changes in weather correspondingly induce changes in PV production. At the same time, intermittent clouds also cause fluctuations in generation profiles. These factors make forecasting PV generation a challenging problem. Embodiments of the subject invention can use a combination of non-parametric regression, LASSO-Elastic Net regularization, and MLP-PSO to predict the generation of PV in short-term horizons (e.g., horizons of 15 minutes ahead), thereby providing an improved solution to this challenging problem.

FIG. 1 shows a schematic diagram of a methodology used to make PV generation predictions, according to an embodiment of the subject invention. Referring to FIG. 1, the MLP model design can include 1 input layer, 5 hidden layers (with 15, 10, 6, 3, and 3 neurons), and 1 output layer. The activation functions applied on each hidden layer is hyperbolic tangent, with the inclusion of a bias unit. The weights are initialized per uniform distribution with a lower bound of −1.5 and an upper bound of 1.5. The number of particles in the PSO swarm is chosen to be 15, and the number of iterations for which the PSO is run is 2. These hyperparameters are not random, but rather they were carefully selected using a grid search algorithm such that they minimized the MSE (loss function) over 1000 epochs. Nevertheless, a different number of particles in the PSO swarm can be used, and/or a different number of iterations for which the PSO is run can be used, in alternative embodiments.

Feature engineering to minimize overfitting and determine the best relationship between the predictors and target variables has been performed. To determine the best relationship, non-parametric regression was conducted, and to reduce overfitting, regularization was conducted. The original features and regularized, fitted models of PV generation, were fed into the MLP as features to achieve best performance in prediction.

Figure 2:
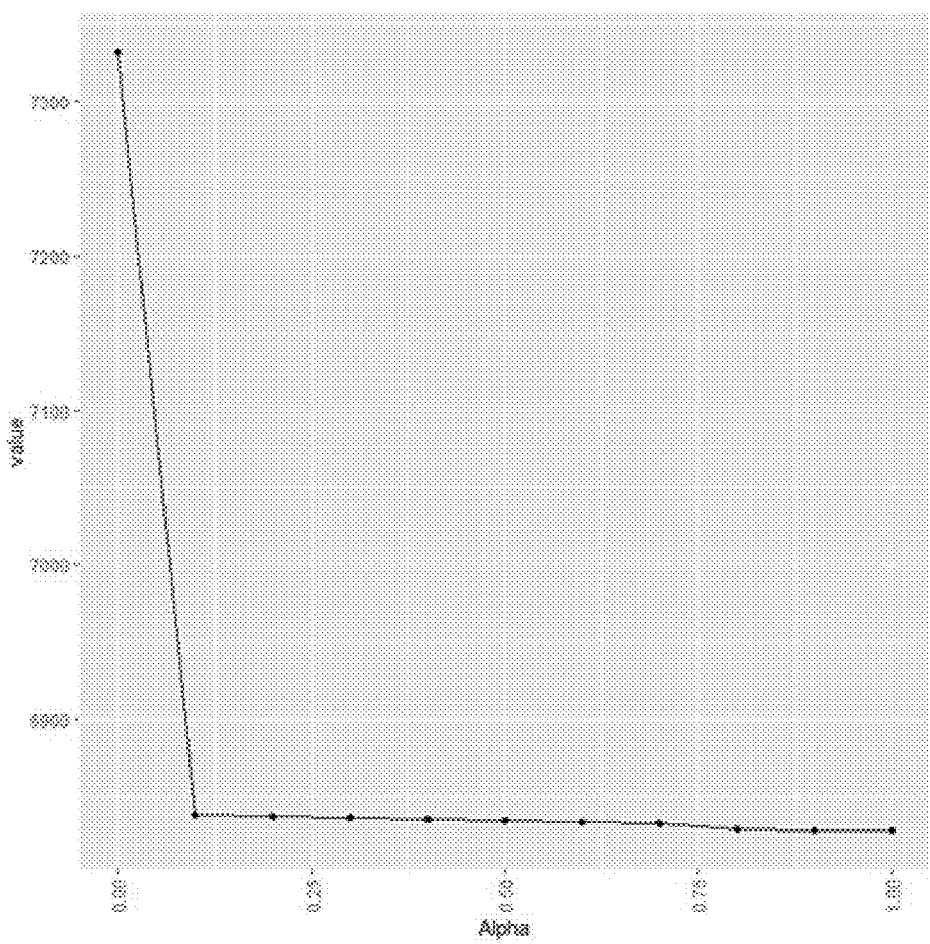
FIG. 2 shows a plot of the variation of MSE with the values of alpha, where the model is ridge (L2-regularized) when $\alpha=0$ and it is LASSO (L1-regularized) when $\alpha=1$.
Figure 3A:
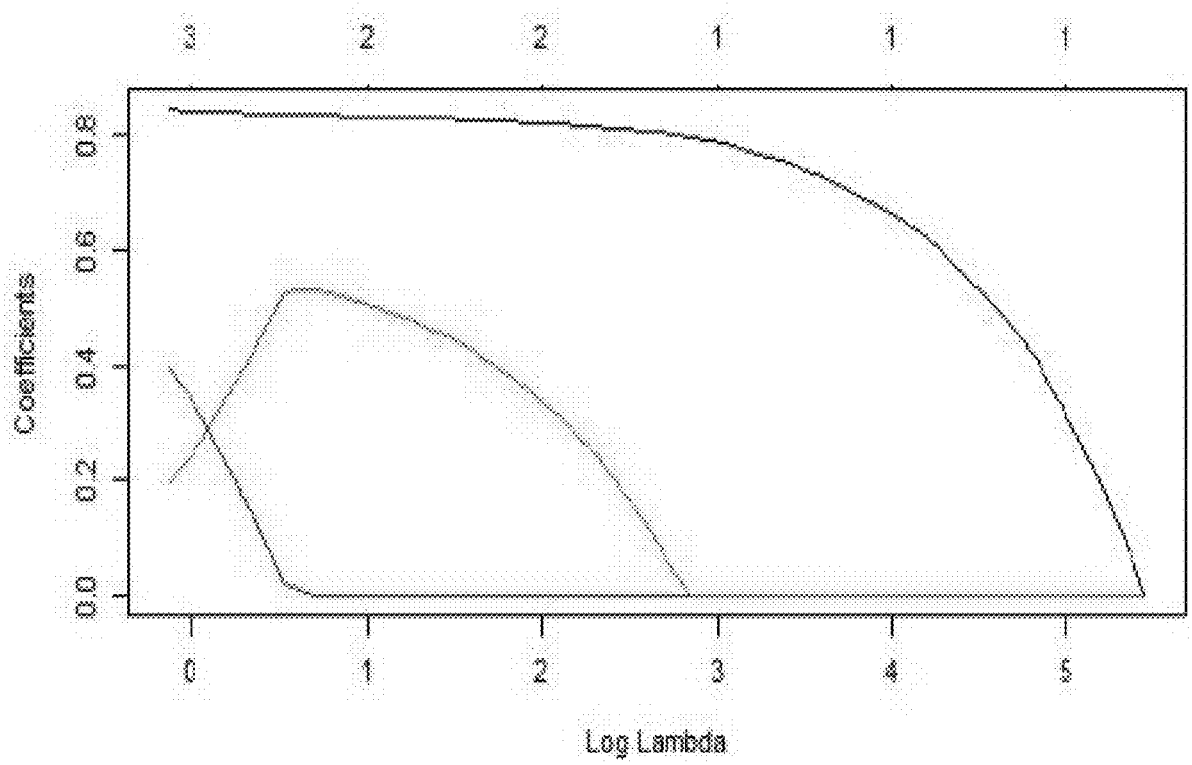
FIGS. 3(a)-3(f) are log-lambda plots showing the coefficients and MSE for ridge, LASSO and Elastic Net regularization models.
Figure 3B:
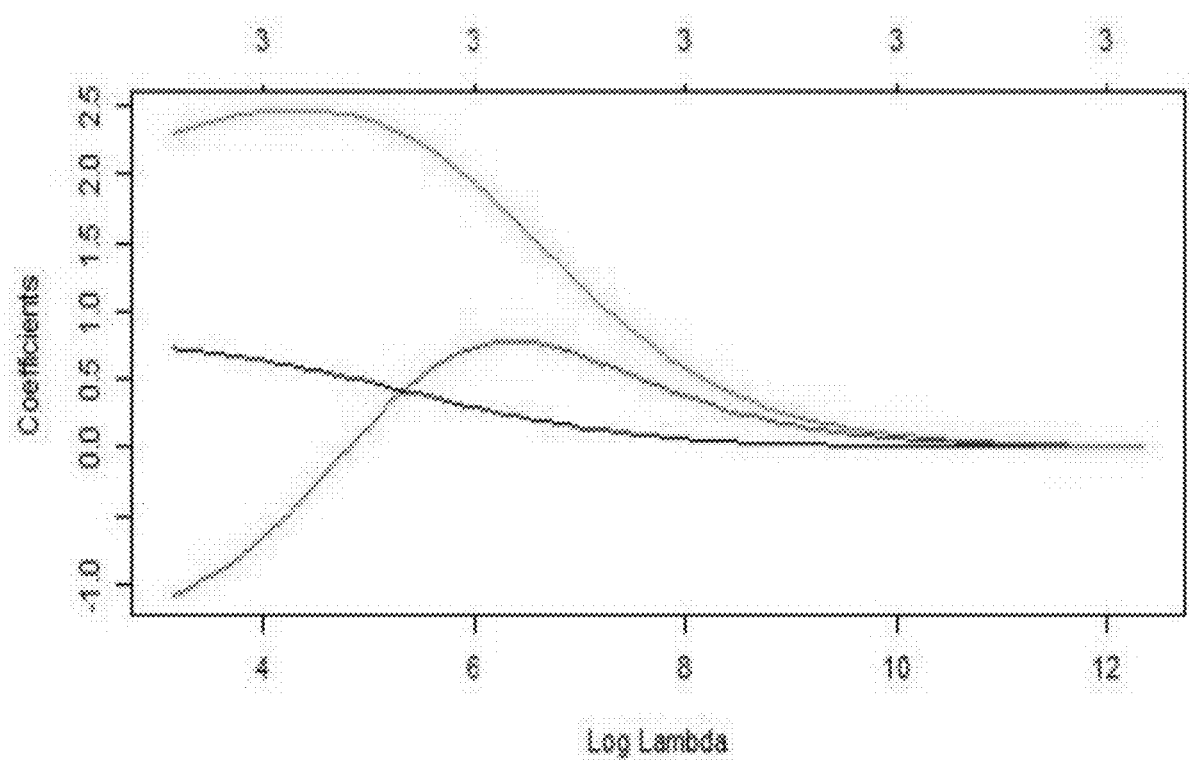
Figure 3C:
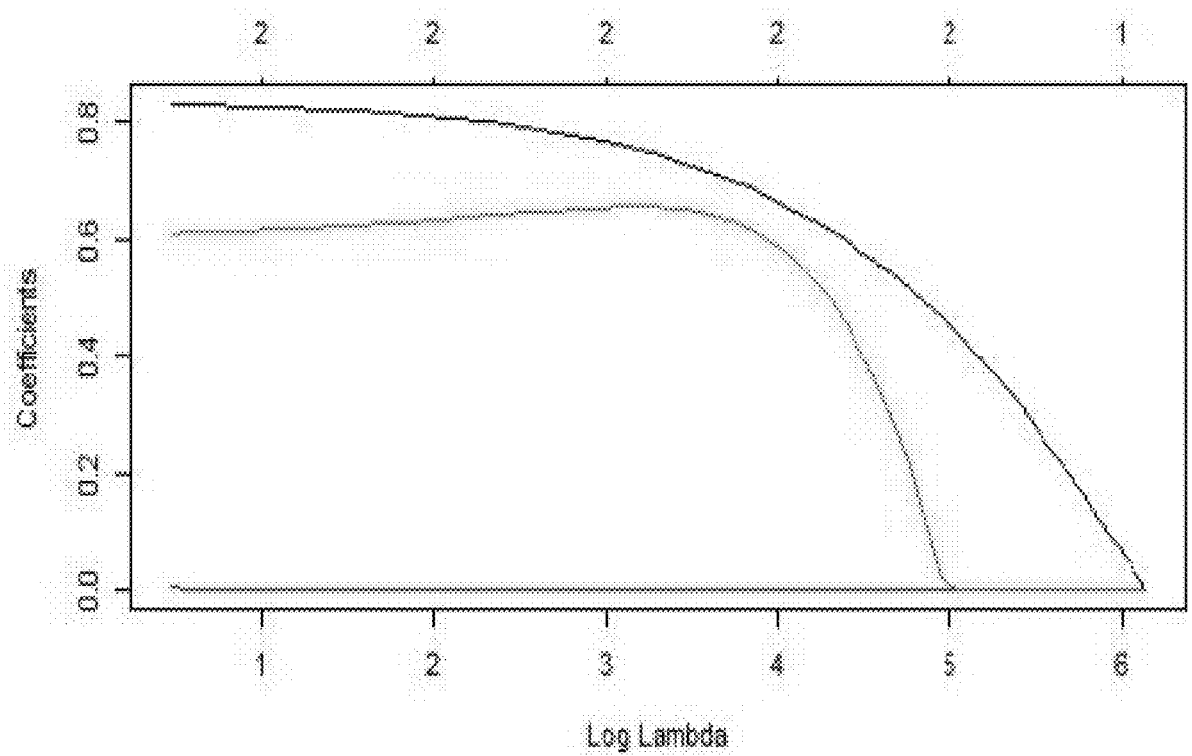
Figure 3D:
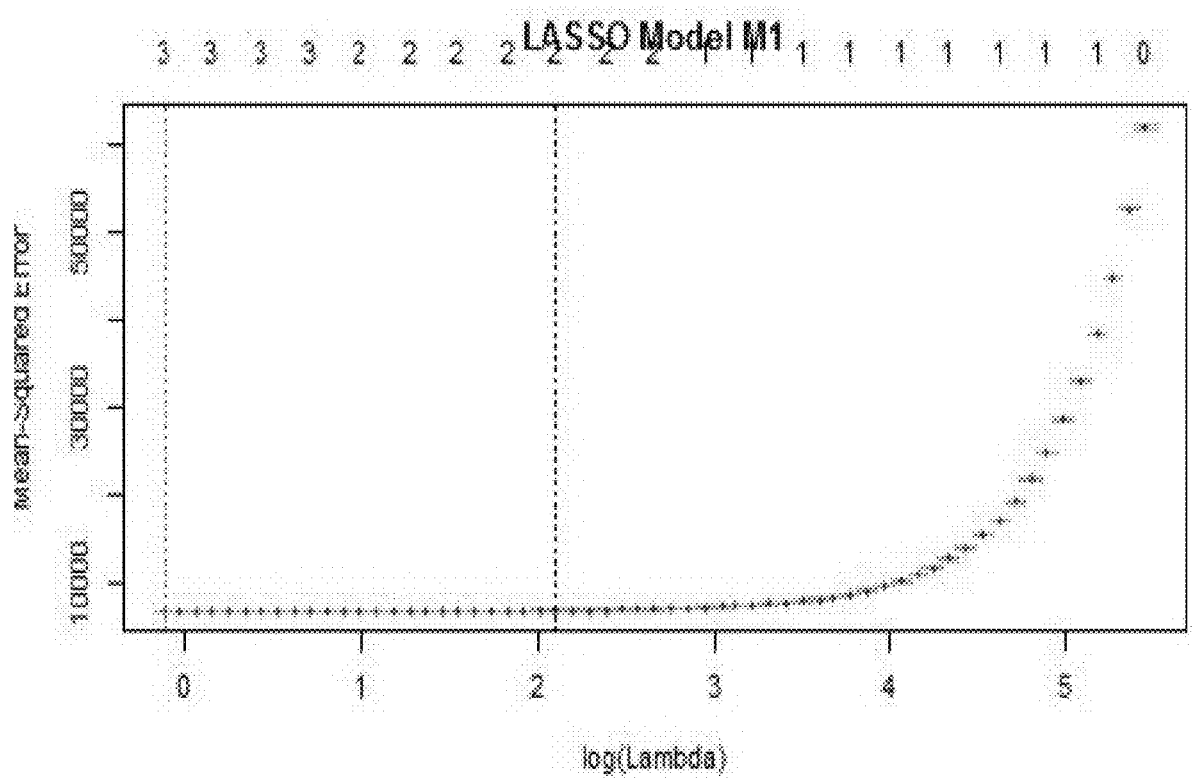
Figure 3E:
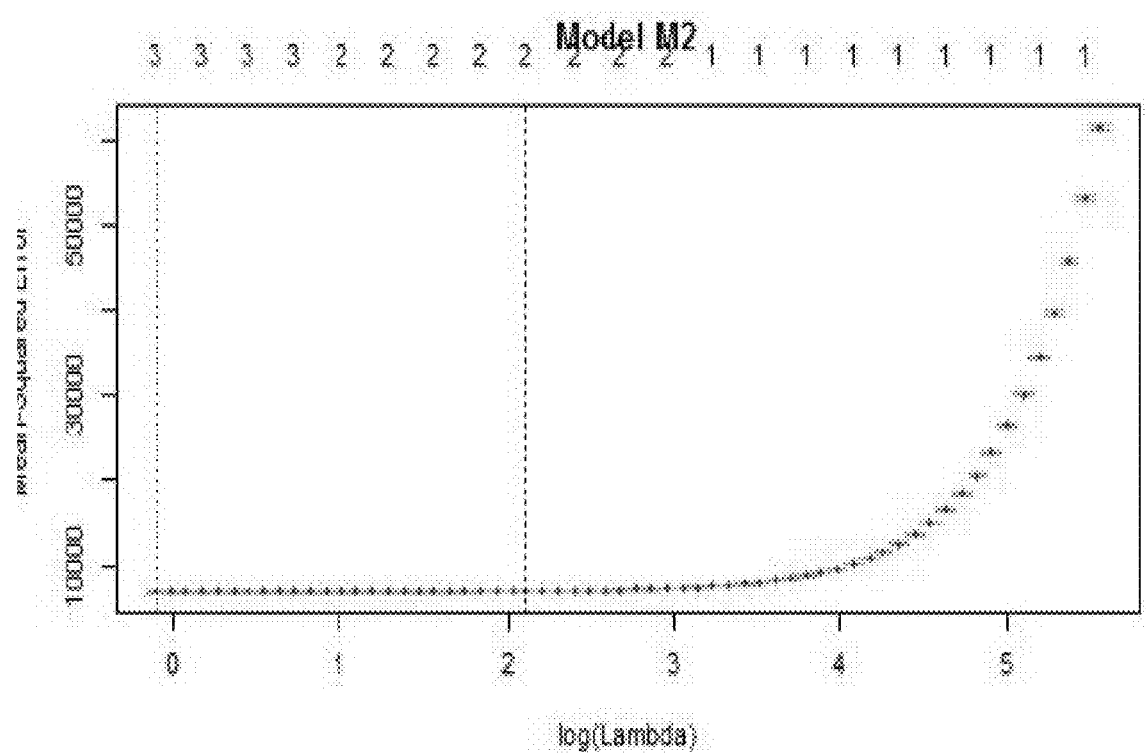
Figure 3F:
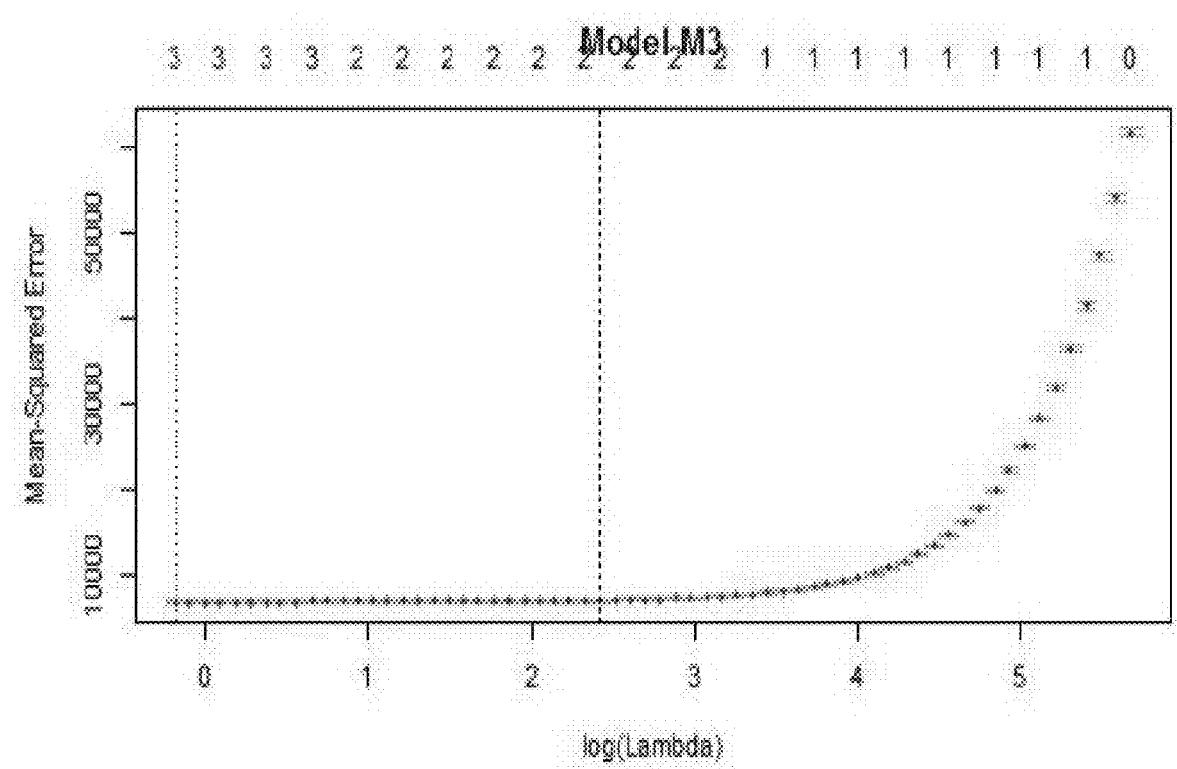

FIG. 2 shows a plot of the variation of MSE with the values of alpha, where the model is ridge (L2-regularized) when α=0 and it is LASSO (L1-regularized) when α=1. FIG. 2 demonstrates how, for different values of a ranging from 0 (ridge) to 1 (LASSO), the loss function of MSE varies. This is in accordance with Equation 2.1. The values of MSE are minimum for the LASSO model, followed by elastic net models with α=0.9 and 0.8, respectively. These models, denoted by M 1, M 2, and M 3, respectively, are considered cumulatively as the regularized representations of the relationships between the target variable (PV generation) and predictor variables (irradiance, ambient temperature, and module temperature). The coefficients and intercepts corresponding to these three best-fit models are summarized in Table 1.

FIGS. 3(a)-3(f) are log-lambda plots showing the coefficients and MSE for ridge, LASSO and Elastic Net regularization models. Referring to FIGS. 3(a)-3(f), the area under the curve plots for models M 1 (FIGS. 3(a) and 3(d)), M 2 (FIGS. 3(b) and 3(e)), and M 3 (FIGS. 3(c) and 3(e)) are shown, where each colored line represents the values taken by each input feature. As the value of A approaches 0, the value of the model approaches the OLS loss function (MSE).

TABLE 1

Coefficients and intercepts of the 3 best-fit models

| Parameter | Best Fit Model M 1 (α = 1) | Best Fit Model M 2 (α = 0.9) | Best Fit Model M 3 (α = 0.8) |
|---|---|---|---|
| Intercept | −45.5344988 | −45.8486085 | −46.5534806 |
| Irradiance Coefficient | 0.8420546 | 0.8411289 | 0.8411371 |
| Ambient Temperature Coefficient | 0.3940970 | 0.3606784 | 0.3658204 |
| Module Temperature Coefficient | 0.1969828 | 0.2360844 | 0.2397310 |

TABLE 2

Performance of MLP-PSO

| Phase | Metric | Value |
|---|---|---|
| Training | Root mean square error | 87.2811 |
| Training | Mean absolute error | 48.9058 |
| Training | $R^2$ score | 0.8782 |
| Training-Development | Root mean square error | 43.1254 |
| Training-Development | Mean absolute error | 31.2757 |
| Training-Development | $R^2$ score | 0.9618 |
| Development | Root mean square error | 59.8940 |
| Development | Mean absolute error | 43.8642 |
| Development | $R^2$ score | 0.9196 |

Figure 4A:
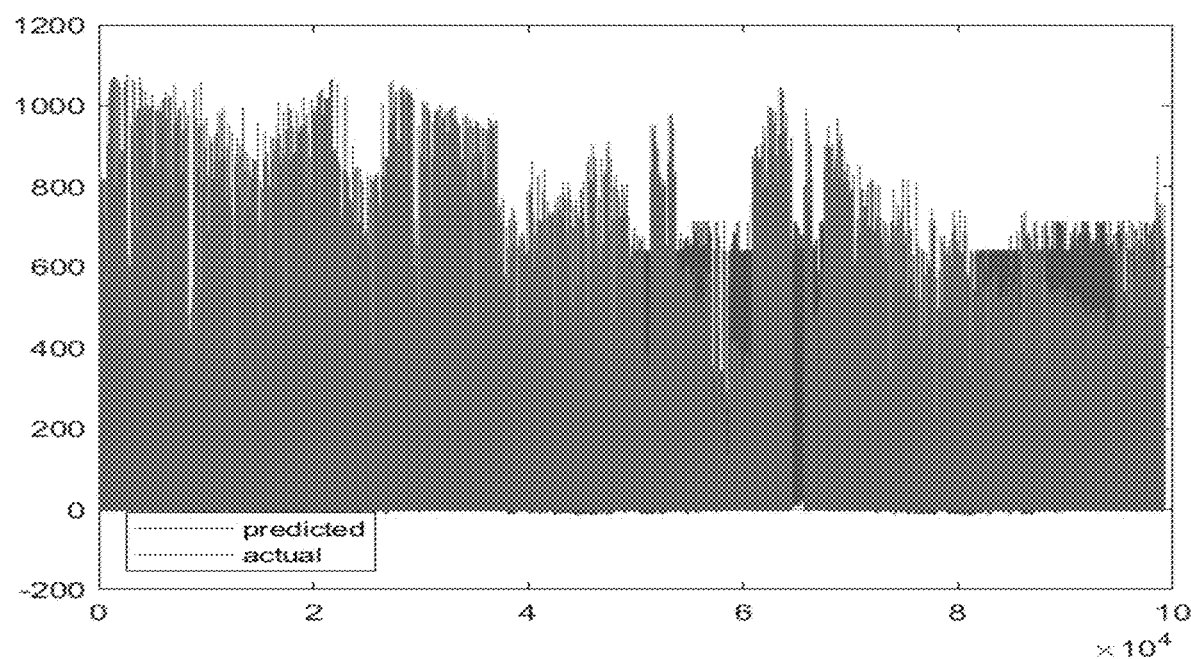
FIGS. 4(a)-4(c) show plots of actual and predicted PV generation for: training with a training set (FIG. 4(a)); training with a development set (FIG. 4(b)); and validating with a development set (FIG. 4(c)).
Figure 4B:
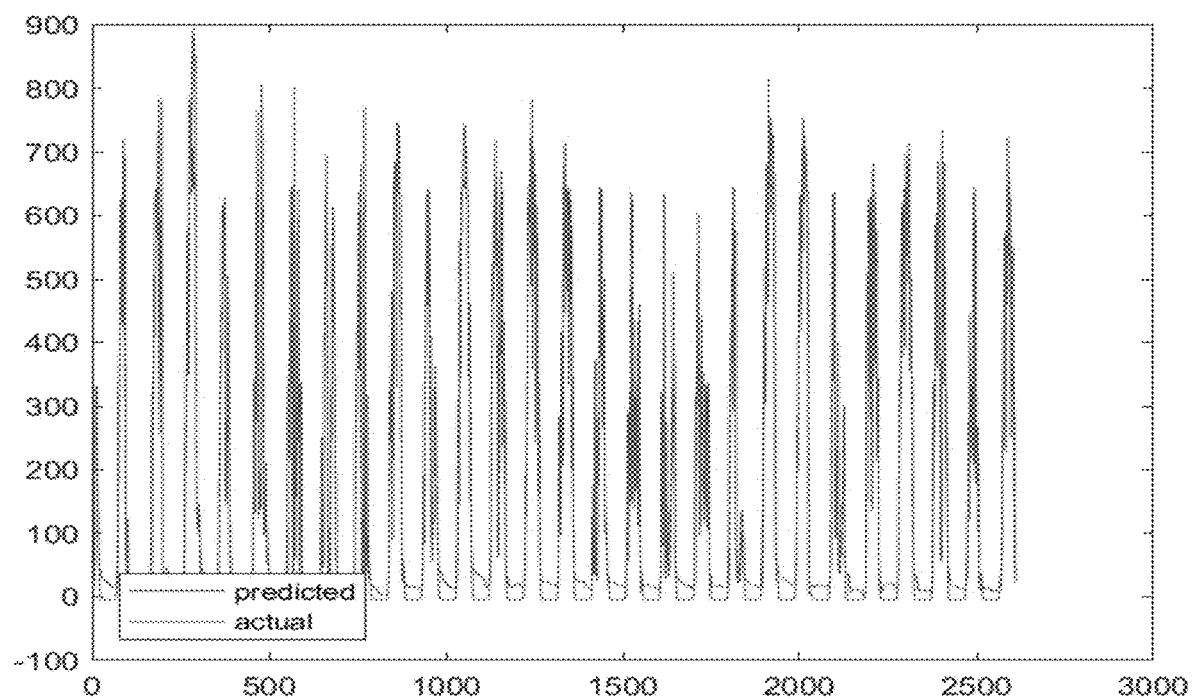
Figure 4C:
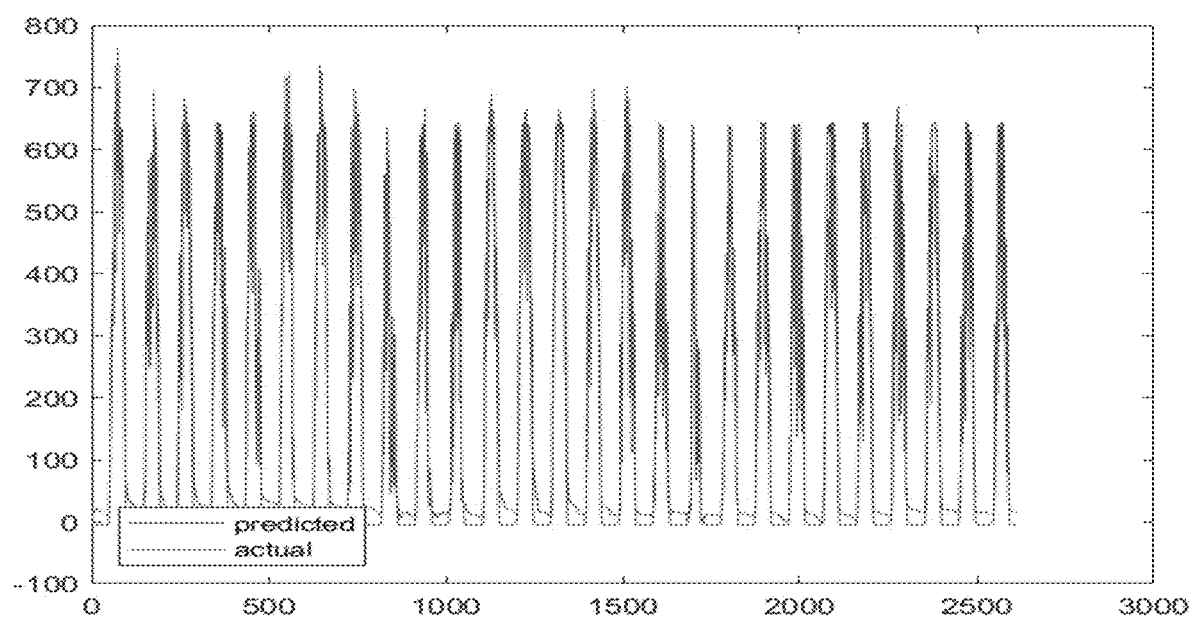

Thus, for a small value of λ, the value of the loss function should be close to 0, as seen in the plots on the right hand side. The coefficients seen in Table 1, together with the regression model outputs for PV generation with respect to each predictor (irradiance, ambient temperature and module temperature) shown in FIG. 1 as REG IRR, REG AmbTemp, and REG ModTemp, respectively (as denoted in Eq. (3.1), where $P_I$, $P_{AT}$ and $P_{MT}$ denote the PV generation modeled with respect to irradiance I, ambient temperature AT, and module temperature MT, respectively), are fed as 6 input features into the MLP model. Using PSO described in Algorithm 3 for training, the results obtained are illustrated in FIGS. 4(a)-4(c) and corresponding error measures are documented in Table 2. FIGS. 4(a)-4(c) show plots of actual and predicted PV generation for: training with training set (FIG. 4(a)); training with development set (FIG. 4(b)); and validating with development set (FIG. 4(c)).

When compared with the PV prediction done using the input features of irradiance, ambient temperature, and module temperature alone, which produced RMSE of the orders of 84 in training, 41 in training-development, and 62 in development phases, this approach reduces the gap between the error measures in the three phases, indicating better generalization performance and reduced likelihood of overfitting.

Embodiments of the subject invention provide a unique combination of non-parametric regression, regularization, and MLP trained using PSO, which can be used to reliably predict PV generation. The combinatorial model can use historical values of irradiance, ambient temperature, and module temperature to make its predictions. However, it can be easily adapted to take as inputs the forecasts of these three features by following the same methodology outlined in FIG. 1. The results achieved can provide utilities with valuable information about future values of PV generation that will therefore enable better planning and generation commitment for dispatch needs.

Embodiments of the subject invention can include utilizing software comprising, for example, one or more (or all) of the following modules.

Module 1. Image processing-driven cloud coverage detection using convolutional neural networks and computer vision, and forecasts of cloud cover % using LSTM-CNN.

Module 2. A hybrid data-model method using historical generation and system-specific deration factors for numerically estimating PV generation.

Module 3. SARIMA-based model to make univariate forecasts of irradiance, ambient temperature, module temperature, humidity, precipitation, and other weather parameters.

Module 4. Parametric regression that takes results from Module 3 and give regression model outputs correspondingly.

Module 5. MLP-PSO based model to take outputs from Modules 1, 2, and 4 as features to predict correspondingly the value of PV generation.

Module 6. The use of EPI and PPI to evaluate and compare performances of PV systems.

Figure 5:
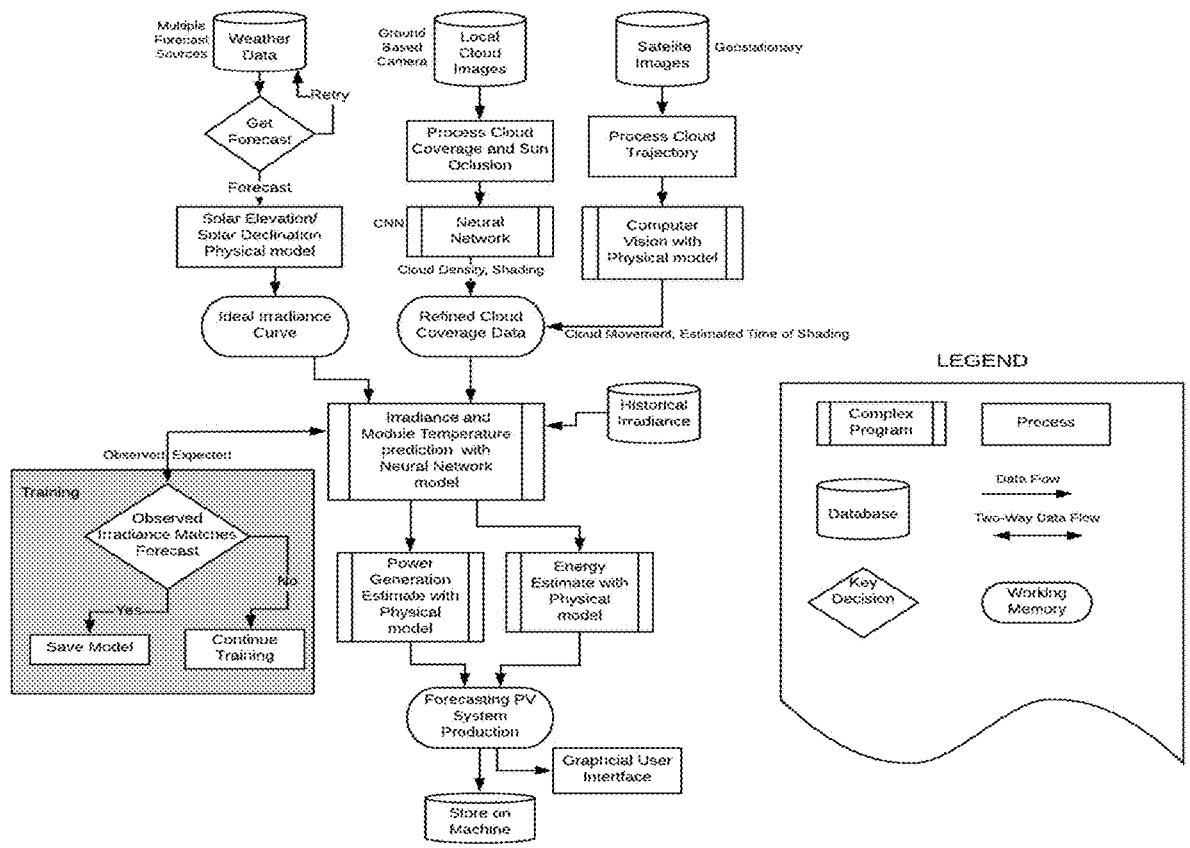
FIG. 5 shows a flowchart of interactions between modules, according to an embodiment of the subject invention.

Interactions between modules are in the flowchart of FIG. 5, and can use as inputs, for example, one or more (or all) of the following time-series datasets.
1. Sky Imager
   a. 5 to 10-minute sky images recorded from the 1.4 MW PV system (not yet started)
2. Satellite Images
   a. 5-minute images of the cloud tops, water vapor, brightness index from satellite (ongoing)
3. AlsoEnergy
   a. 1-minute resolution Irradiance (W/m2) from 1.4 MW PV system (3+ years: 08/16 to now)
   b. 1-minute ambient temperature (F) from 1.4 MW PV system (3+ years: 08/16 to now)
   c. 1-minute PV module temperature (F) from 1.4 MW PV system (3+ years: 08/16 to now)
   d. 1-minute generation (kW) from 1.4 MW PV system (3 years: 08/16 to now)
4. Weather Station
   a. 16-second resolution data from weather station measuring irradiance, ambient temperature, module temperature, humidity, precipitation, wind speed, wind direction Module 1: Image processing-driven cloud coverage detection and forecasting Inputs: Sky-camera cloud images (1-minute)

Outputs: % of cloud coverage, predicting cloud position and irradiance for next five minutes (1-minute resolution)

Models: GAN, LSTM-CNN

Platform: Python

A 3-step algorithm can be used to detect the cloud coverage using the images captured from a wide-angle camera placed at the elevation of the PV system. Separately, using satellite imagery, derive cloud movement and imminent local cloud formations can be derived. Explanations of the 3 steps for the image series processing for ground-based camera are given as:

Step 1: Detecting Sun in the Picture

Convolutional Neural Networks (CNN) can be used to detect if there is a sun in the picture or not. Sub-part of step 1 is to cover the sun, if exists, with black so that it is not mistaken as a cloud in next step.

Step 2: Detecting Type of Sky from 3 Predefined Types

In this step the image is classified as one of the three types:
1. Sunny/Mostly Clear
2. Overcast/Fully Covered
3. Partially Cloudy (or just Cloudy)

This helps in the next step, where if it is sunny, this can simply be concluded. If it is overcast or partially cloudy, specific actions need to be performed in the third step.

Figure 7A:
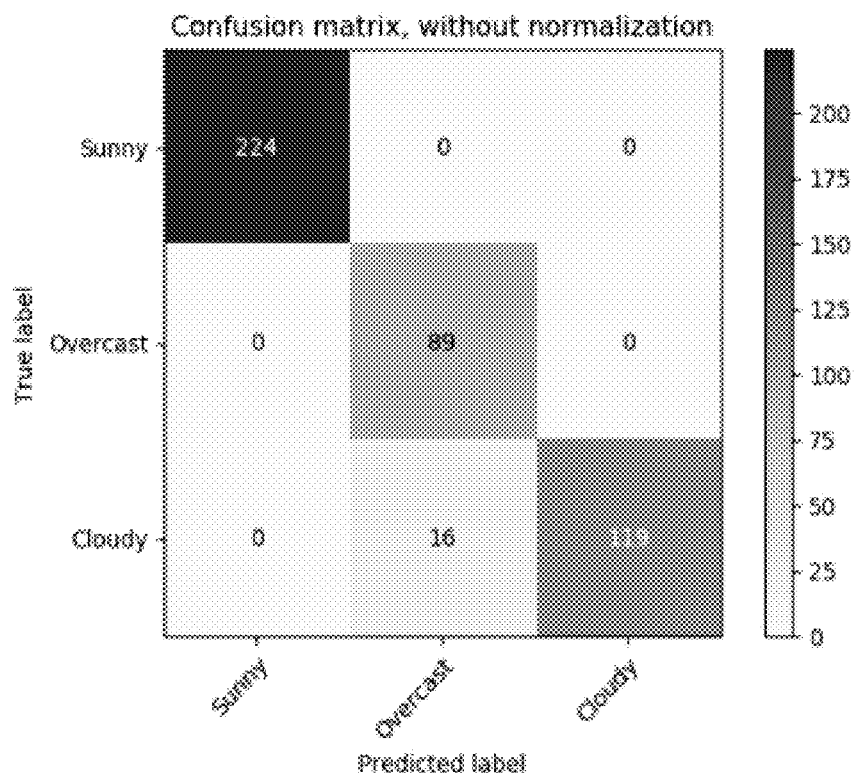
FIG. 7(a) shows a confusion matrix for a convolutional neural network (CNN) that can be used according to an embodiment of the subject invention.

Another CNN will be used. This can be trained on 448 mixed images for 3 classes having an accuracy of 0.964. The confusion matrix is seen in FIG. 7(a).

Step 3: Percentage of Coverage

Figure 7B:
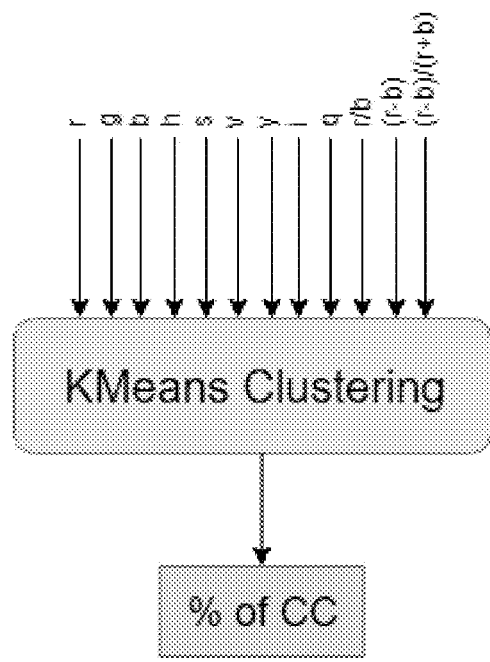
FIG. 7(b) shows a flowchart for a methodology that can be used according to an embodiment of the subject invention.
Figure 7C:
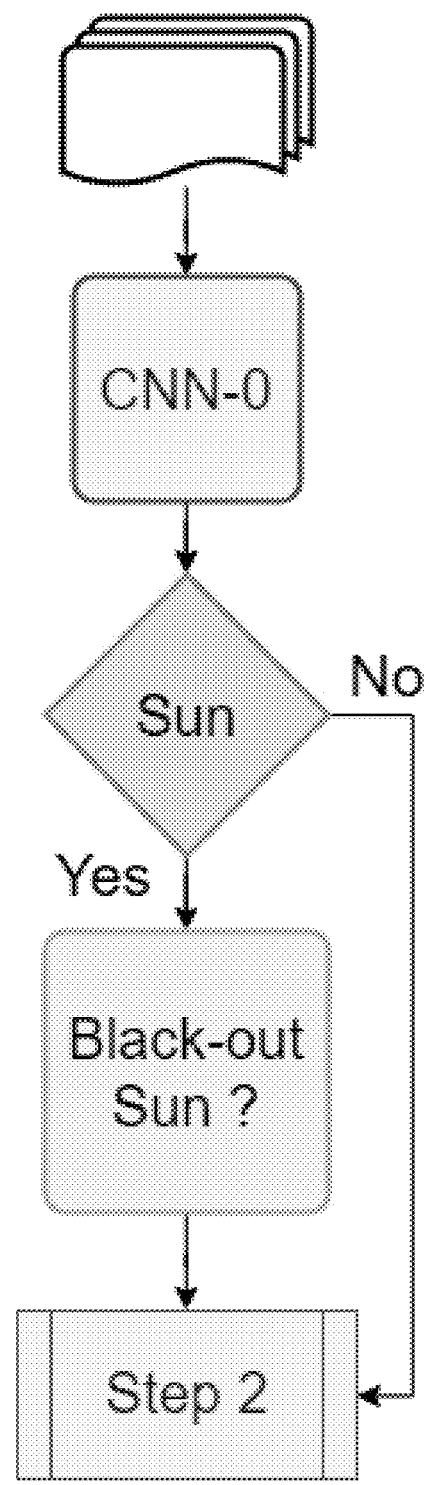
FIG. 7(c) shows a flowchart for a methodology that can be used according to an embodiment of the subject invention.
Figure 7D:
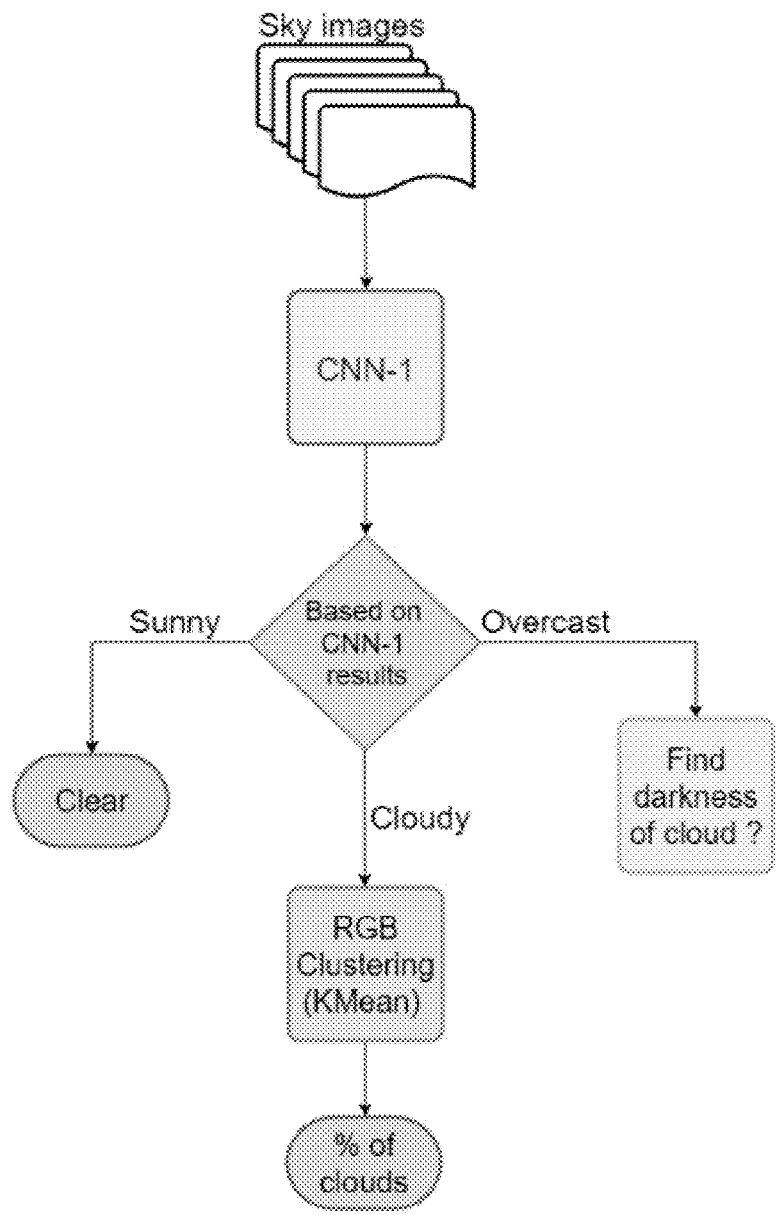
FIG. 7(d) shows a flowchart for a methodology that can be used according to an embodiment of the subject invention.

If the output of Step 2 is "Cloudy", a K-means cluster can be used to divide the pixels into two classes ['sky', 'cloud'], and the ratio of cloud versus total can give the percentage of cloud coverage. K-means can be used because labeled data with cloud coverage is not used; if generation will be predicted and percentage of coverage based of previous data is available, we more advanced supervised learning models can be used. If the output of Step 2 is "Overcast" shade of the grey can be calculated, which will help in regression over the PV generation. See also FIGS. 7(b)-7(d), which show flowcharts of the methodology used in Module 1.

Figure 6:
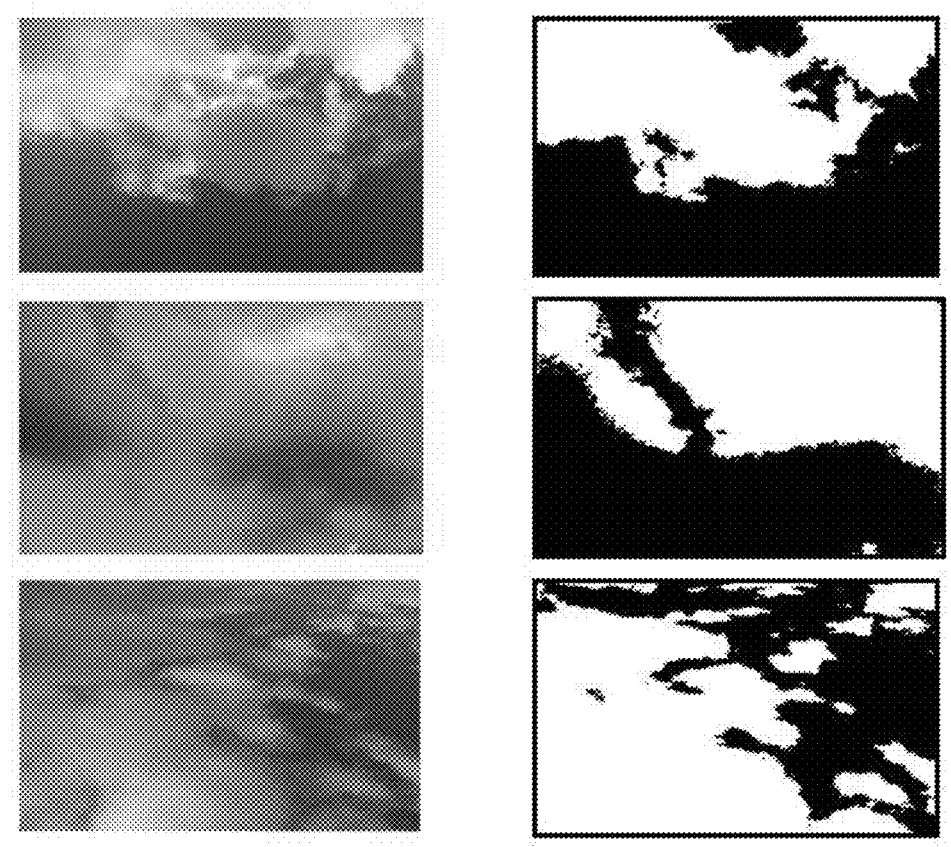
FIG. 6 shows sky images (left side) and the corresponding converted images (right side).
Figure 8:
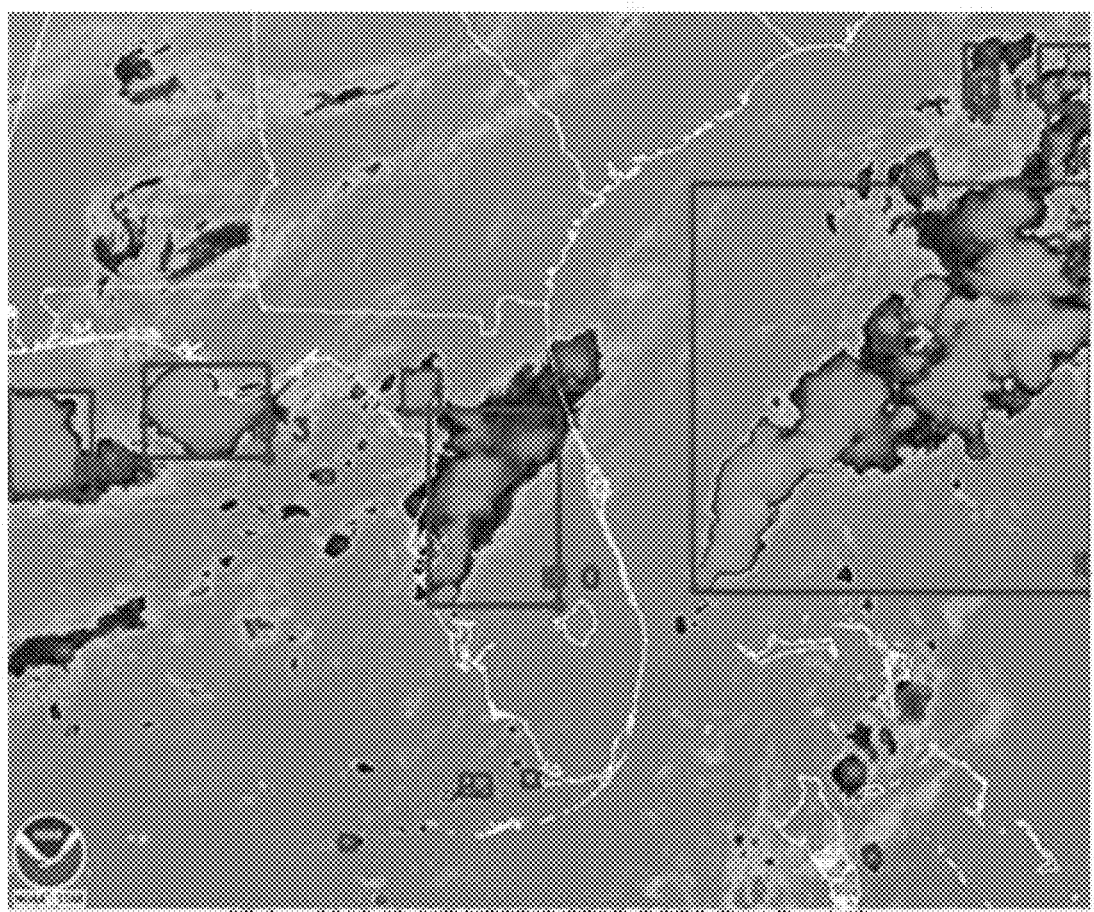
FIG. 8 shows an example satellite image.

For the satellite imagery, an overhead view of the cloud formation in large geographical areas is realized (FIG. 8 shows an example satellite image). Using the series of images from GOES-16 the direction and area of cloud formations in the region can be calculated. By placing the location of the PV system into this algorithm it is possible to determine an estimated time of arrival of large cloud formations over the PV system, though the stochastic nature of cloud formations makes accuracy of time of arrival vary. This approach does give information that can be used for further in time-based PV power and energy forecasting. It is noted that FIG. 6 shows sky images (left side) and the corresponding converted images (right side).

Module 2: Estimating PV Generation Using a Hybrid Data-Model Method

Inputs: irradiance, module temperature, deration factors, DC nameplate capacity, average module temperature Outputs: estimated PV generation Model: Hybrid Data-Model Method (HDMM)

Platform: R

Figure 9:
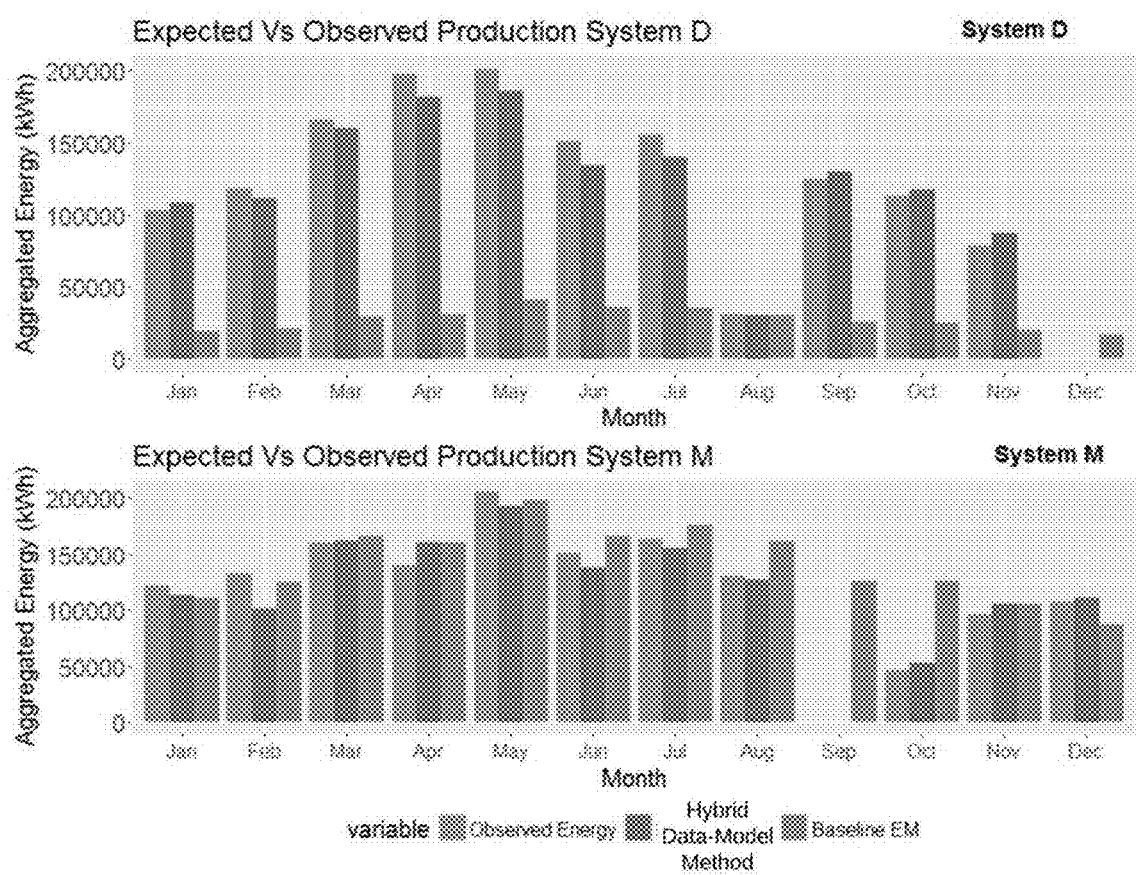
FIG. 9 shows bar charts with results for a module that can be used according to an embodiment of the subject invention.

This method can employ the fine-tuned Equations (1) and (2) below to estimate the PV generation. Tables 3-5 show the parameters used in Equations (1) and (2). FIG. 9 shows bar charts with results for Module 2.

$$P_{estimate}(t) = P_{DC\_size} \times \left\{ \frac{Ir(t)}{1000} \right\} \times \\ \left\{ 1 + \frac{\%_{temp\_coef}}{100}[T(t) - X] \right\} \times p_{dirt} \times p_{mismatch} \times p_{cable\_loss} \times p_{inverter} \quad (1)$$

$$p_{mismatch} = \frac{P_{panel} - P_{MPP}}{P_{MPP}} \quad (2)$$

TABLE 3

Parameters from Equations (1) and (2)

| Definition | FIU PV System |
|---|---|
| Dirt deration factor | 0.9 |
| Module mismatch factor | 0.97 |
| Cable Loss factor | 0.99 |
| Maximum inverter efficiency | 0.98 |
| Temperature coefficient | −0.5 |
| DC system size of PV plant | 1104 |

TABLE 4

Parameters from Equations (1) and (2)

| Value of X | Method |
|---|---|
| 25 | Corrected to nominal temperature |
| Average Mod. Temp. | Corrected to average module temperature but not wind seed |
| Average Cell Temp., Wind Speed factored in | Corrected to wind speed too; most accurate form of measure |

TABLE 5

Parameters from Equations (1) and (2)

| Parameter | System M | System D |
|---|---|---|
| Location | Miami | Daytona |
| Latitude-Longitude | 25.76° N, 80.36° W | 29.18° N, 81.05° W |
| Elevation (ft) | 10 | 33 |
| Nameplate rating (MW)($P_{DC}$) | 1.4 | 1.28 |
| AC Capacity (MW) | 1.104 | 1.035 |
| Number of inverters | 46 | 36 |
| Number of inverter models | 1 | 8 |
| CEC inverter efficiency ($p_{inverter}$) | 0.98 | 0.975-0.986 |
| Number of PV modules | 4,480 | 4,200 |
| Module efficiency (%) | 16.5 | 16.5 |
| Number of strings in series × number of arrays | 56 × 4 | 35 × 6 |
| Modules per string | 20 | 20 |
| Tilt, Azimuth of array | 5°, 268° | 5°, 268° |
| Soiling derate factor ($p_{dirt}$) | 0.9 | 0.9 |
| Cabling loss factor ($p_{cable}$) | 0.99 | 0.99 |
| Temperature coefficient (% $temp_{coeff}$) | −0.5 | −0.5 |
| Module mismatch factor ($p_{mismatch}$) | 0.97 | 0.97 |

Module 3: Forecasting Irradiance, Ambient Temperature, Module Temperature 15-Minutes Ahead
Inputs: historical irradiance, ambient temperature, module temperature
Outputs: 15-minute ahead forecasts of each parameter
Model: Seasonal autoregressive integrated moving average (SARIMA)
Platform: Python
Steps for Implementation:
 1) Take input CSV for Module Temperature, irradiance, Ambient Temperature and convert the dataset to time series.
 2) Check for stationarity of the time series using Dickey Fuller test
 3) Use Decomposition to segregate the components Trends, Seasonal and Residual components for the input dataset.
 4) Plot the Decomposition to segregate the components Trends, Seasonal and Residual
 5) Calculate the values of p, d, q, P, D and Q using AIC estimator.
 6) Perform Seasonal ARIMA over the on our input dataset.
 7) Split train and test dataset.
 8) Input N=15 in stepwise_model for 15 minutes ahead prediction.
 9) Training the model using the stepwise_model. Fit over the train dataset.
 10) Evaluating the efficiency of the forecasted dataset with the test dataset.
 11) Concatenating the forecasted and original dataset for visualization.
 12) Calculate and Print RMSE (Root Mean Square Error), MSE (Mean Squared Error)
 13) Once the forecast model fits retrain the entire dataset and reform prediction for future values.
 14) Plot the results of the forecast output 15 minutes ahead.

Figure 10:
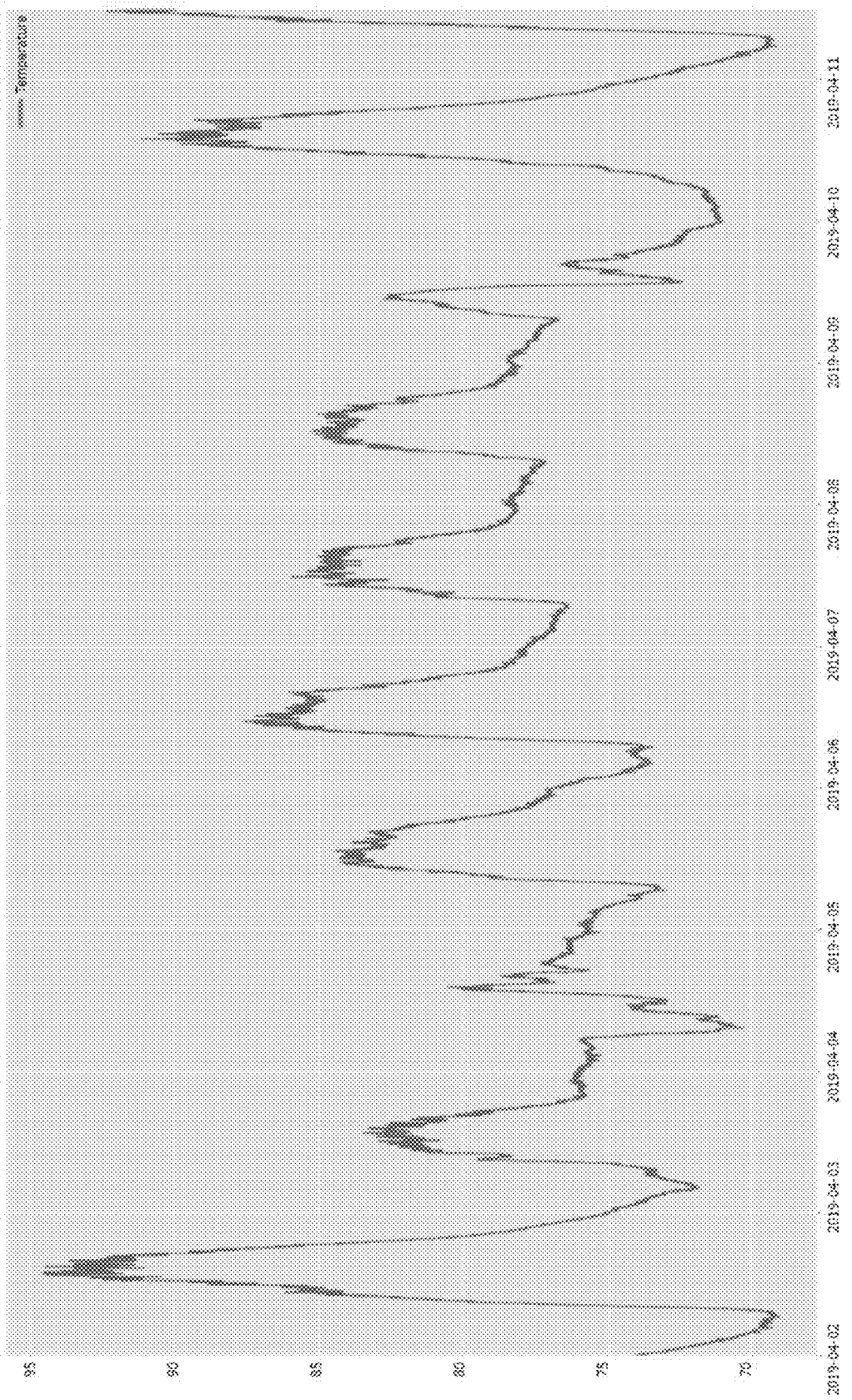
FIG. 10 shows a plot of historical temperature, which can be used as input for a module according to an embodiment of the subject invention.

Detailed Steps of Forecasting Model:
Input
 Historical Data for Ambient Temperature, Module Temperature and Irradiance.
Output
 15 minutes ahead forecast for Ambient Temperature, Module Temperature and Irradiance.
Importing and Processing the Data
 Quick processing can be performed to convert the historical data of temperature, irradiance, module temperature to have a time series index using Pandas Library.
Visualizing the Dataset
Matplotlib can be used to visualize the data quickly to notice the stationarity.
Decomposition
 Statsmodel can be used to perform a decomposition of the given time series. The decomposition of time series is a statistical task that deconstructs a time series into several components, each representing one of the underlying categories of patterns. With statsmodels the trend, seasonal, and residual components of the data can all be seen.
Auto ARIMA Function
 The Akaike information criterion (AIC) is an estimator of the relative quality of statistical models for a given set of data. AIC estimates the quality of each model, relative to each of the other models. The AIC value allows comparison of how well a model fits the data and takes into account the complexity of a model, so models that have a better fit while using fewer features will receive a better (lower) AIC score than similar models that utilize more features.
Performing the Seasonal ARIMA
 In order to use Seasonal ARIMA model p, d, q values for the ARIMA, and P, D, Q values for the Seasonal component need to be chosen. While there are many ways to choose these values statistically, such as looking at auto-correlation plots, correlation plots, domain and/or experience, a grid search over multiple values of p, d, q, P, D, and Q can be performed using performance criteria.
Train Test Split
 Stepwise_model object can be used for training data set. As the data is a time series, a portion of the most recent data can be chopped off and used as a test set. Using the train set, we can forecast into future and compare with test set.
Train the Model
 The model can be trained using the .fit function on the stepwise_model by passing the training data.
Evaluation
 The forecasted values can be compared with the test data to measure the performance of the fitted model.
Results Visualization
 The original dataset with the forecasted values can be concentrated on for ease of reference, and the results of 15 minutes Ahead prediction can be plotted. FIG. 10 shows a plot of historical temperature, which can be used as input.

Figure 11:
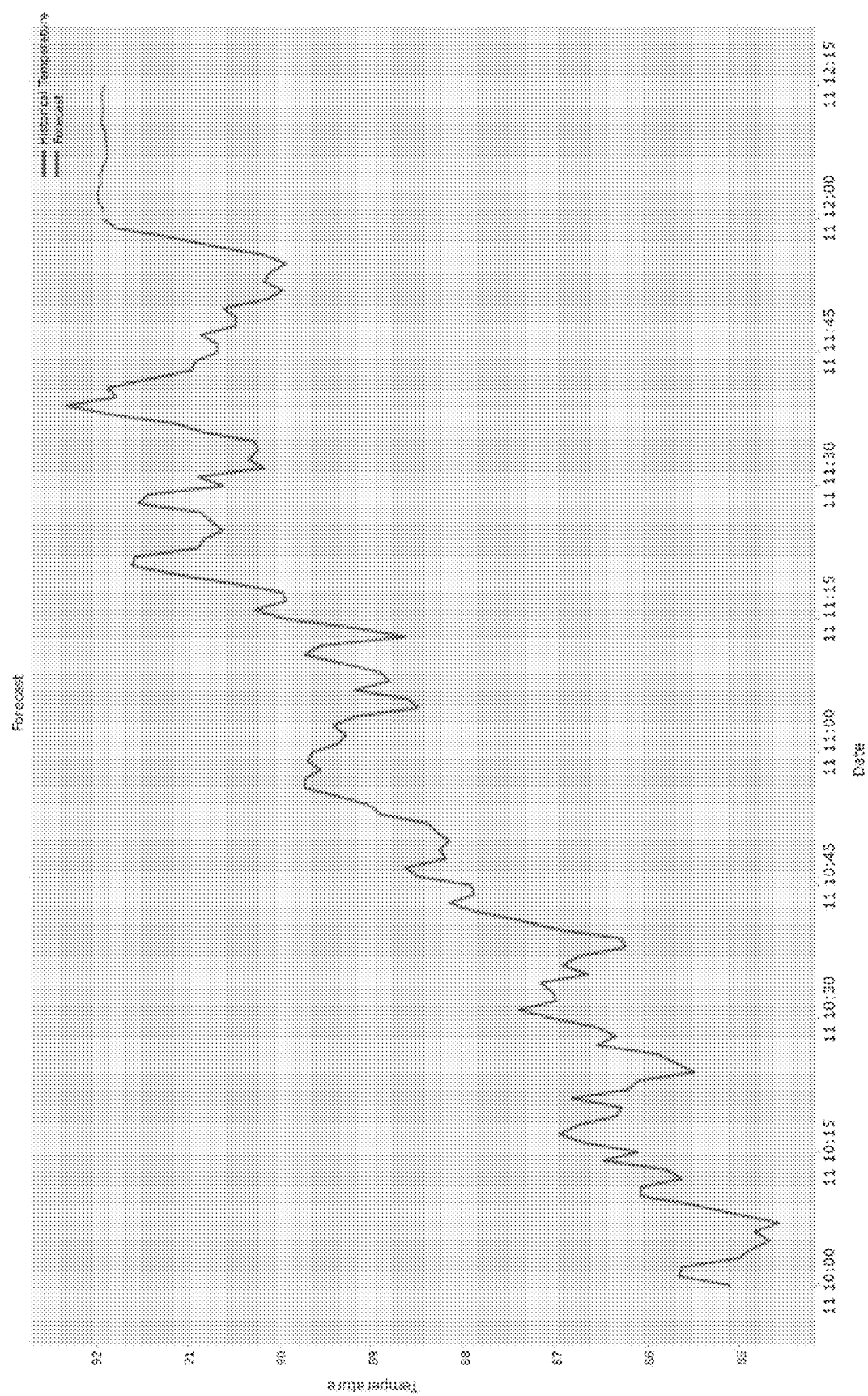
FIG. 11 shows a plot of forecast temperature, which can be an output of a module according to an embodiment of the subject invention.
Figure 12:
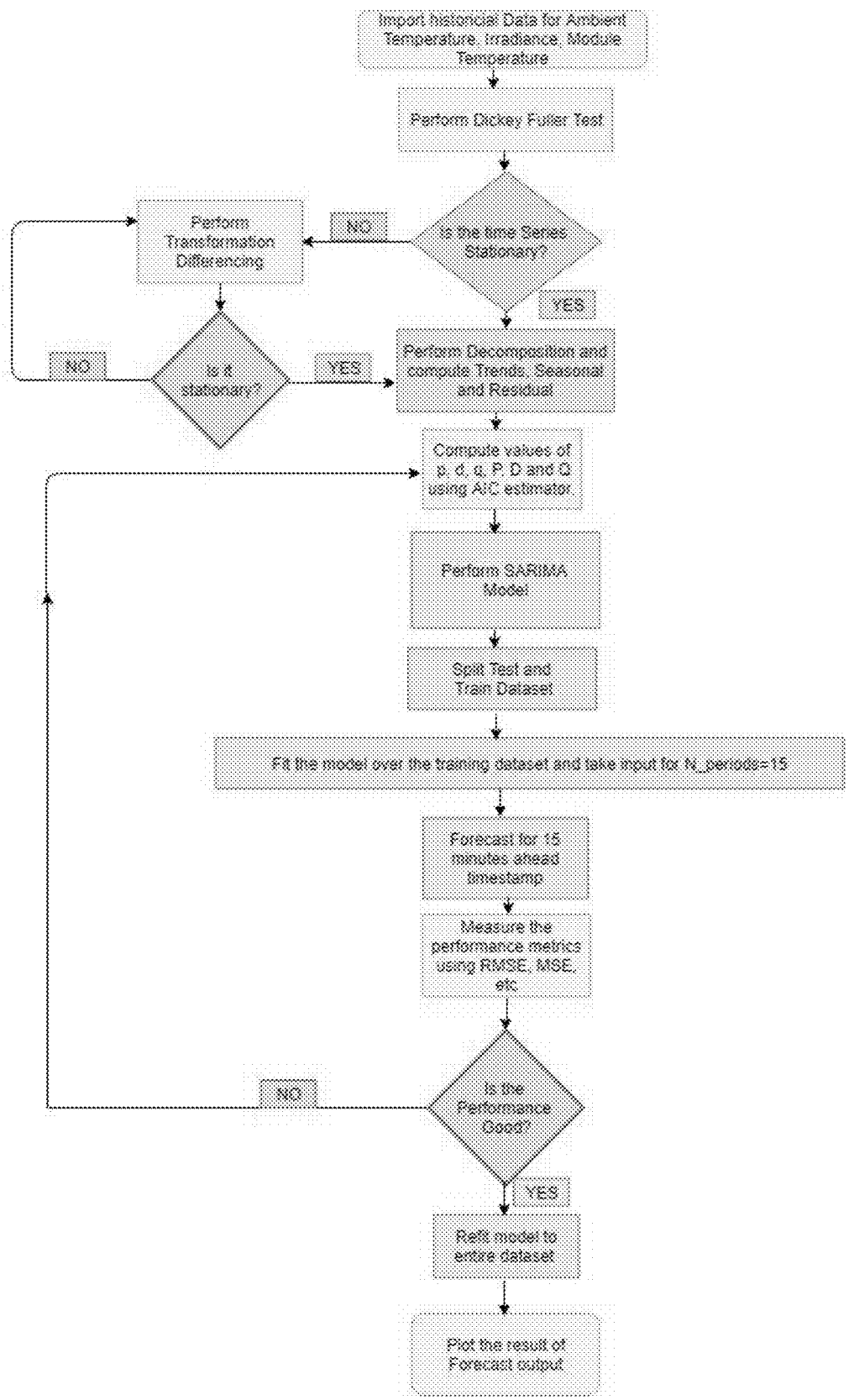
FIG. 12 shows a flowchart for SARMA implementation in a module according to an embodiment of the subject invention.

FIG. 11 shows a plot of forecast temperature, which can be an output. FIG. 12 shows a flowchart for SARMA implementation.

Module 4: Parametric Regression to Determine Relationships Between PV Generation and Other Parameters
Inputs: forecasts of irradiance, ambient temperature, module temperature, humidity, precipitation, cloud cover %
Outputs: PV generation values captured as a function of each input independently and/or in combination
Model: parametric regression with/without sensitivity analysis to determine degrees of importance
Platform: R/Python
Module 5: PV Generation Prediction Using MLP-PSO Model
Inputs: estimated PV generation from Module 2, PV generation values generated by the parametric regression models in Module 4
Outputs: predicted PV generation for 15 time steps ahead
Model: Multilayer perceptron trained using particle swarm optimization
Platform: MATLAB The model can take as features irradiance, ambient temperature, and module temperature, to predict PV generation. The MLP model can have 6 layers (3, 16, 12, 8, 4, 1 neurons, respectively). The number of particles can be 12, and number of iterations can be 1. The train-dev-test ratio can be 80-10-10.
Training—RMSE: 45.6967, MSE: 2088.1844, MAE: 21.5763, R-Sq.: 0.9451
Test Dev—RMSE: 45.9036, MSE: 2107.1397, MAE: 23.8403, R-Sq.: 0.9070
Dev—RMSE: 45.2411, MSE: 2046.7564, MAE: 22.5678, R-Sq.: 0.9519

Figure 13:
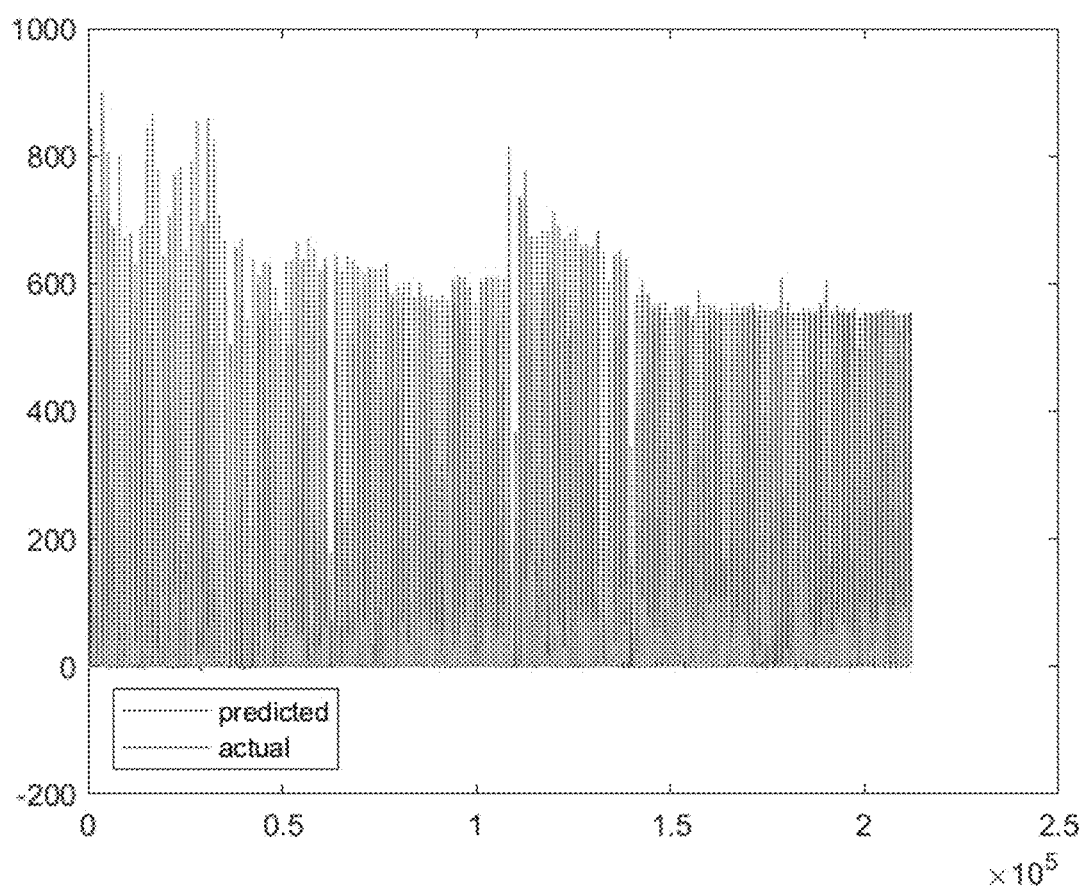
FIG. 13 shows results for a training set for a module according to an embodiment of the subject invention.
Figure 14:
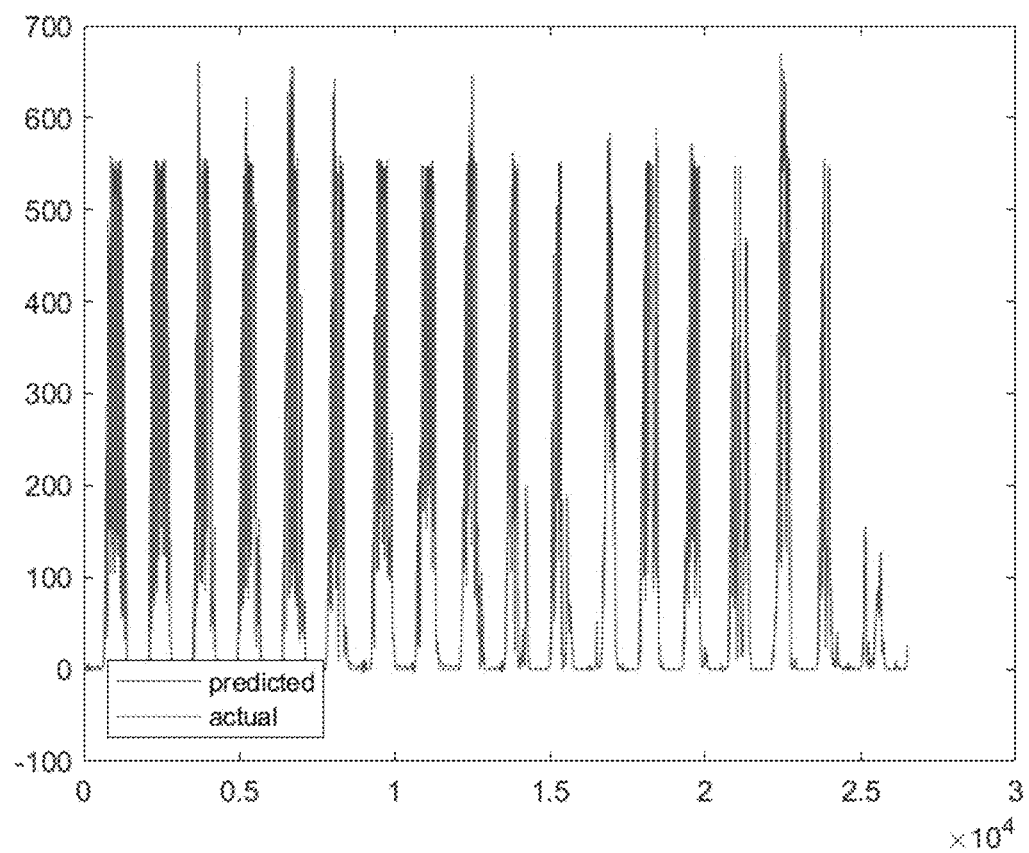
FIG. 14 shows results for a TestDev set for a module according to an embodiment of the subject invention.
Figure 15:
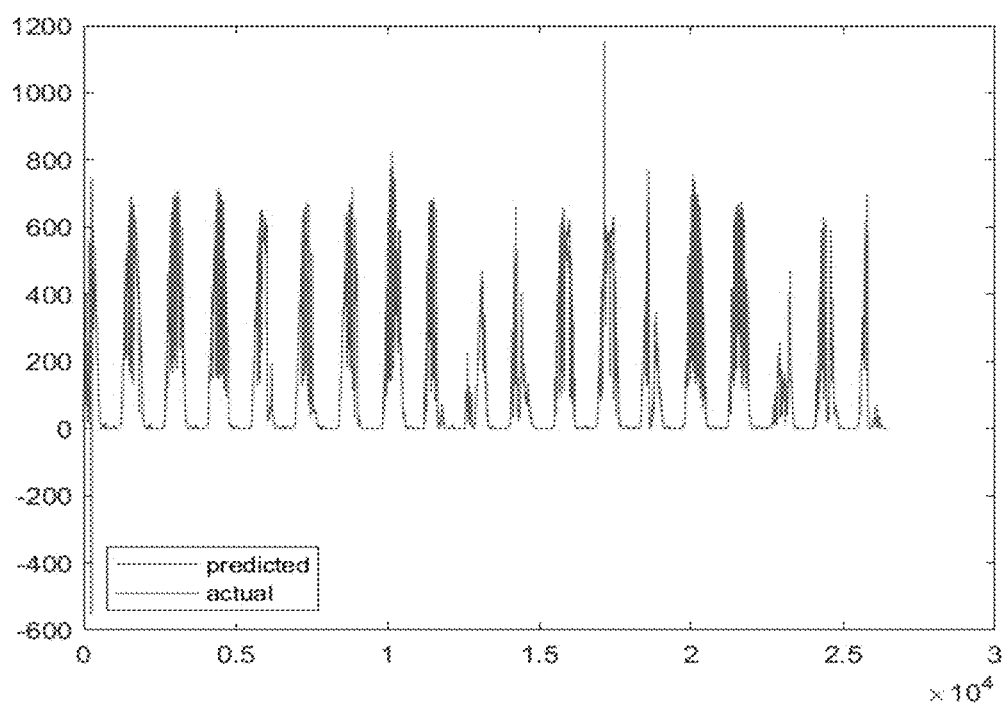
FIG. 15 shows results for a Dev set for a module according to an embodiment of the subject invention.

FIG. 13 shows results for the training set; FIG. 14 shows results for the TestDev set; and FIG. 15 shows results for the Dev set.

Module 6: PV Performance Evaluation Using EPI and PPI
Inputs: actual power and energy, forecast power and energy
Outputs: PPI and EPI values
Model: numeric calculation of the metrics
Platform: R PPI is the power performance index, used to measure instantaneous PV performance, and EPI is the energy performance index, used to measure average PV performance. These are calculated using Equations (3) and (4).

$$PPI(t) = \frac{kWAC_{actual}(t)}{P_{forecast}(t)} \quad (3)$$

$$EPI = \frac{kWhAC_{actual}}{E_{forecast}} \quad (4)$$

Figure 16:
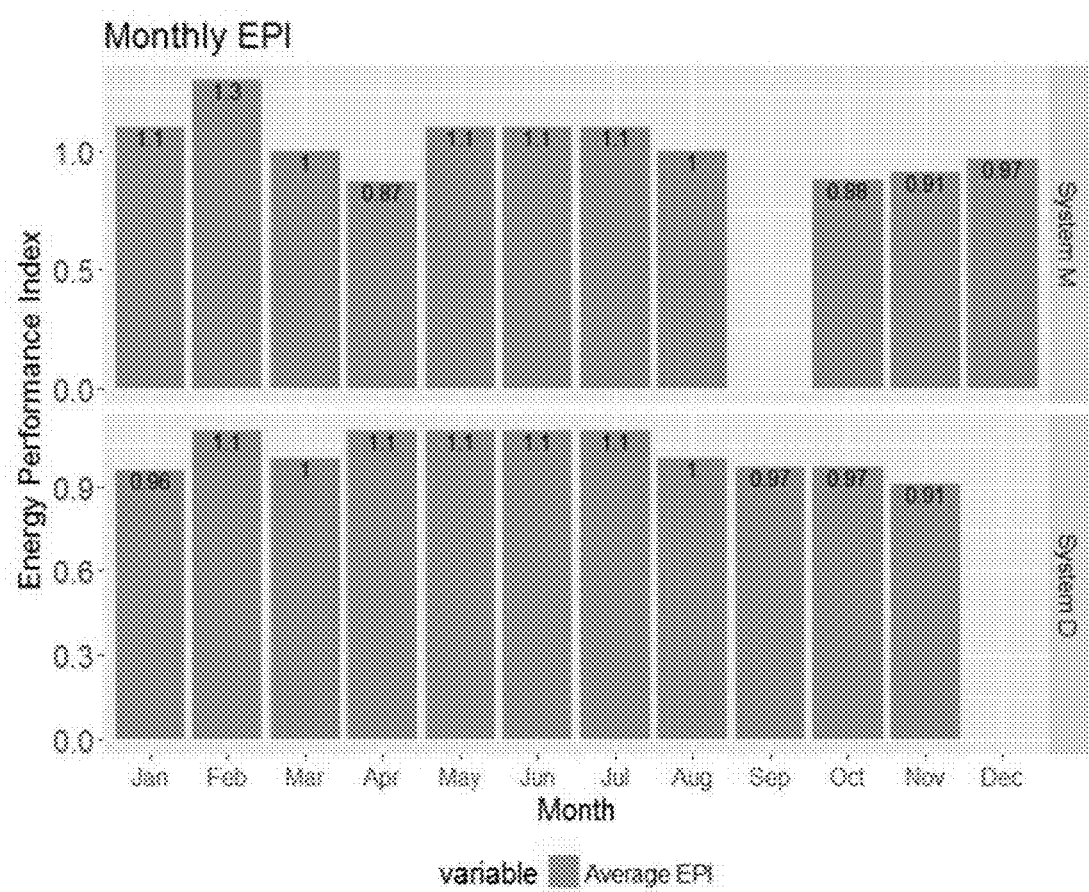
FIG. 16 shows results for the energy performance index (EPI) obtained by a method of an embodiment of the subject invention.
Figure 17:
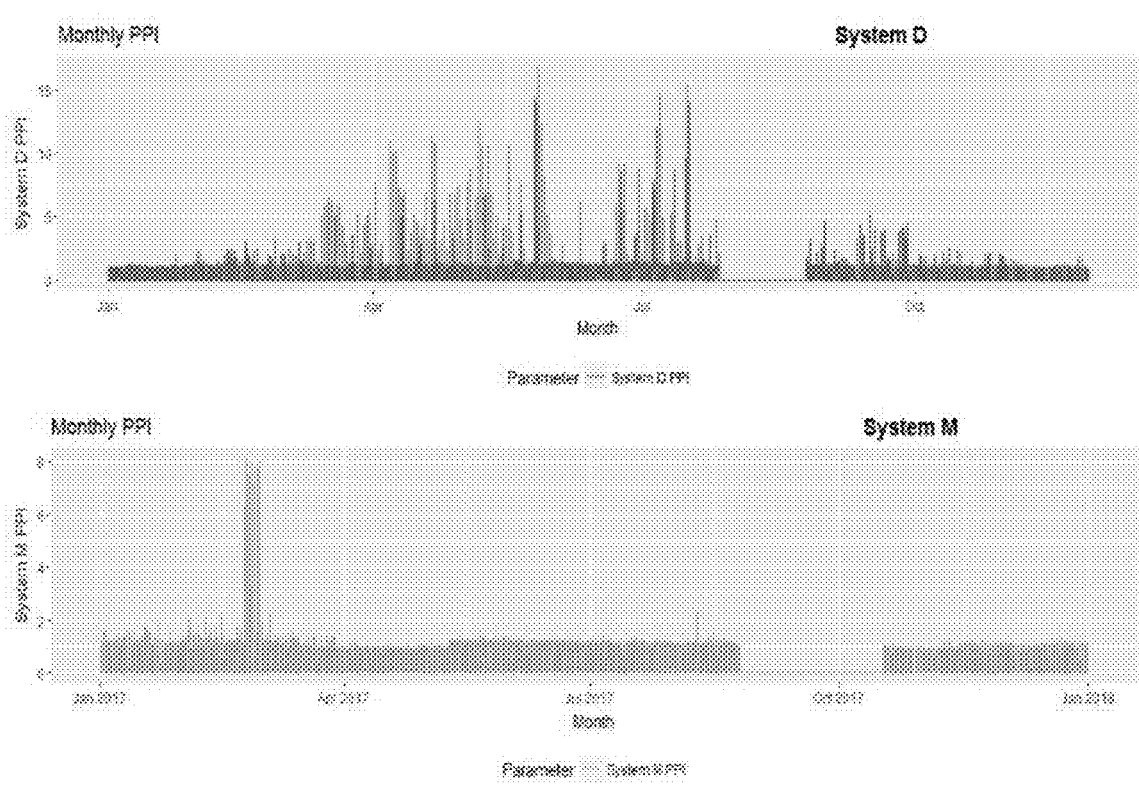
FIG. 17 shows results for the power performance index (PPI) obtained by a method of an embodiment of the subject invention.

The results have been developed for PPI using 15-minute resolution data, but the model can work with other resolutions as well (e.g., 1-minute resolution). Also, results have been developed for EPI averaging over 1 month, but the window can be reduced to other timeframes (e.g., 15 minutes). FIG. 16 shows results for EPI; and FIG. 17 shows results for PPI.

Figure 18:
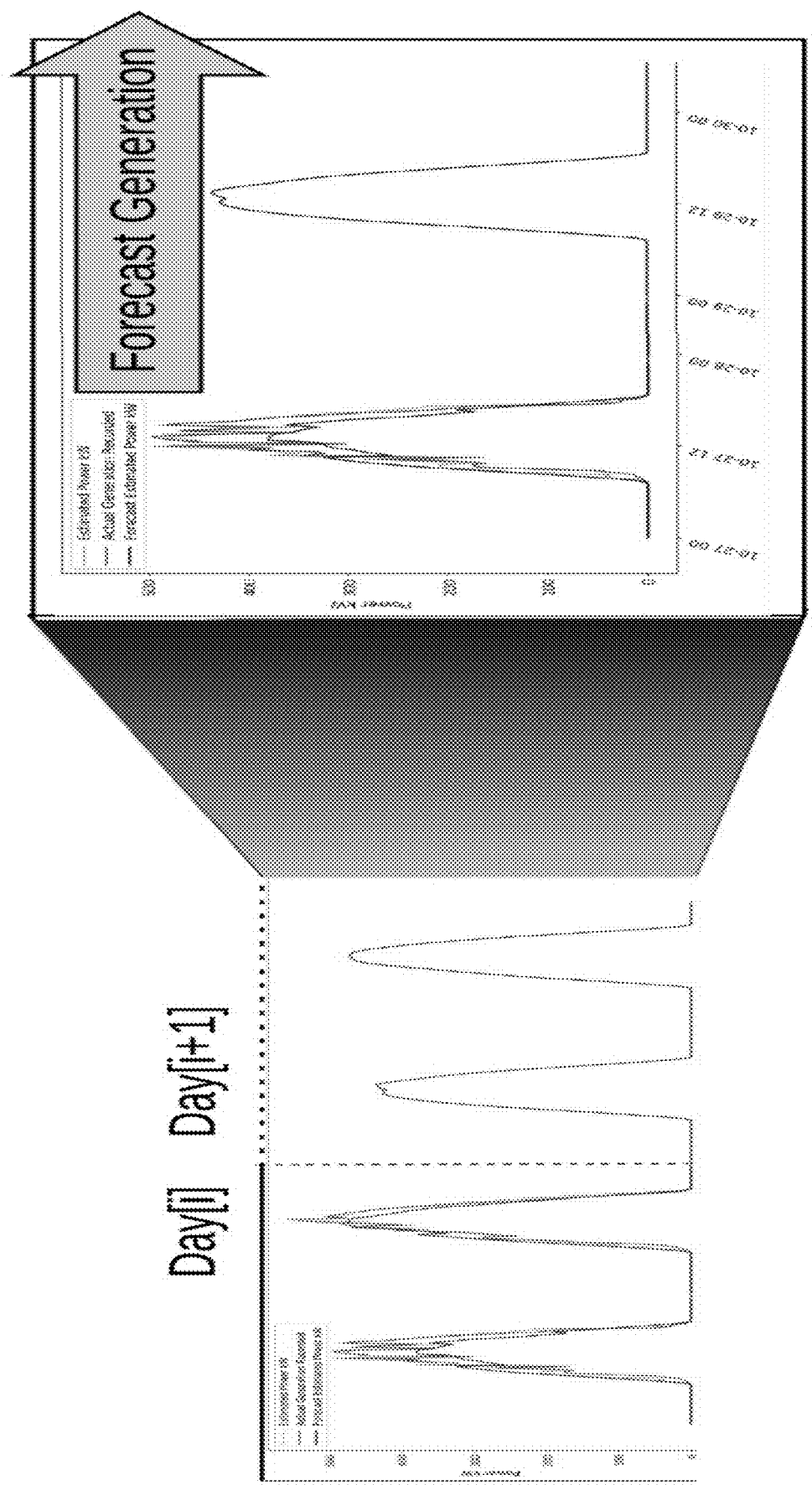
FIG. 18 shows a graph of PV generation forecast.

Embodiments of the subject invention provide methods for forecasting PV generation using holistic weather and system analysis (see also FIG. 18). Derate factors of PV panels can be considered, along with regional weather variability, site specific weather, and a cross-view of sky from ground based and/or geo-stationary satellite imaging. Gathering weather on multiple gradients enables a more robust model that captures a broad range of system inputs.

An important consideration in power estimation from PV solar panels is to include sources of loss that are external to weather specific losses, as this improves the marginal accuracies of power forecasting. Thus, cable loss, mismatch, inverter efficiency, and temperature coefficient can be input parameters that factor into system losses as the derate factors (see also, Sundararajan, "Hybrid data-model method to improve generation estimation and performance assessment of grid-tied pv: a case study," IET Renewable Power Generation, vol. 13, pp. 2480-2490(10), October 2019; which is hereby incorporated herein by reference in its entirety).

A PV system power output curve is similar to the local irradiance curve, and also affected by ambient temperature, with latent dependencies on various weather variables (e.g. humidity, wind speed). The cloud coverage over solar panels interferes with generation in an obvious way, but more subtle parameters of sky transparency and turbidity play a role as well. The effect of turbidity in the clear sky results in decreases in solar radiation received on the earth's surface, and therefore these spectral modeling complexities can be considered in an atmospheric characterization for their effects on solar radiation. In addition to these effects, additional randomized effects such as bird dropping accumulation over time can reduce the output generation of PV panels. Though, the extraneous conditions of panel dirtiness can be ignored, such that it can be assumed that the panel surfaces are kept clean. The primary conditions considered can be the environmental weather changes. Ambient temperature is an important factor in solar panel efficiency, so a temperature coefficient ($P_{max}$) can be used to find the efficiency of a solar panel. The temperature of a panel module follows the ambient temperature with a slight time lag. At standard temperature of 25° C. panels perform well, and for every degree above the standard the efficiency of the panels will drop by a small percentage. For each degree below the standard the efficiency of the panels will increase. The specific change in efficiency varies by manufacturer and model of the PV panel.

Embodiments of the subject invention can be implemented via software, such as software as a service (SaaS) that is capable of deploying in a cloud-computing environment and being accessible through an application programming interface (API). The forecasting mechanism is accurate and self improving. Through online learning the model can update periodically (e.g., every few or several minutes, such as every 10 minutes). The model parameters can include the derate factors of the panels, and therefore account for these losses on the system over time. In order to improve accessibility, the software can operate given a minimal set of necessary operating parameters. In particular, the observed generation is required.

Figure 19:
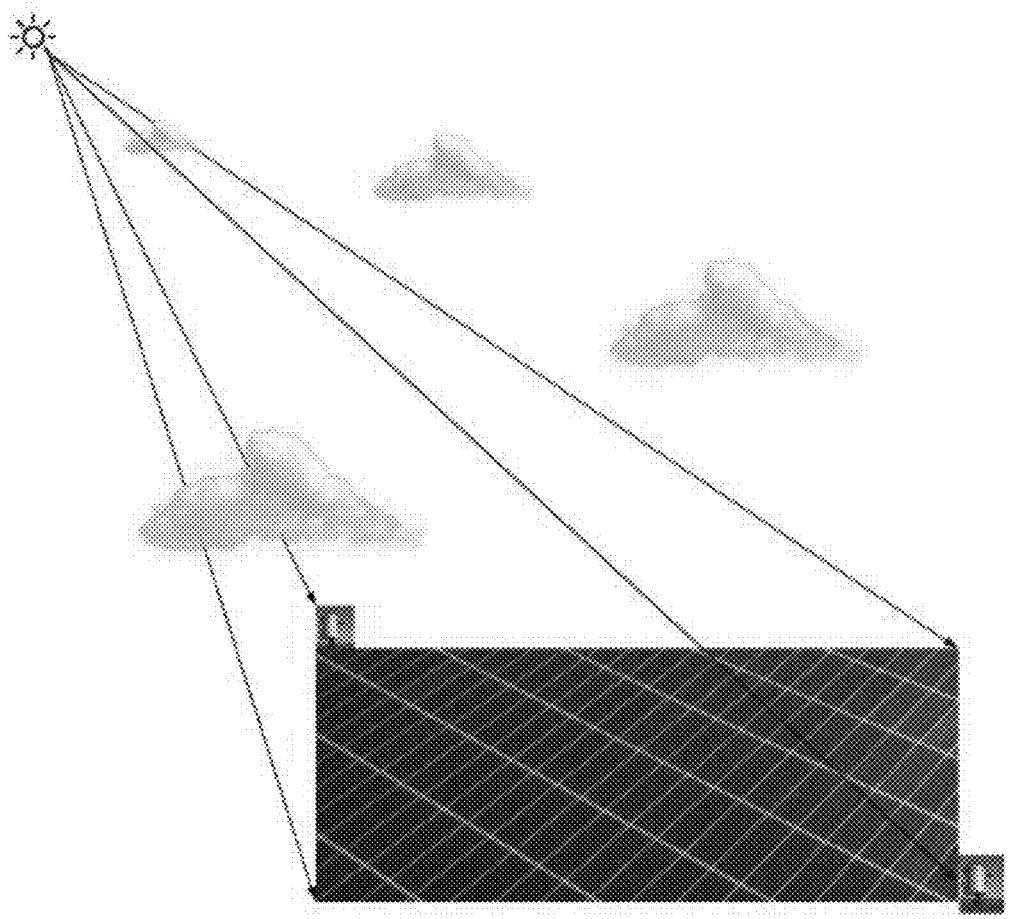
FIG. 19 shows sky imaging and sun position for localized weather collection.

The data for input can be obtained from weather data resources including a local weather station, the National Climatic Data Center (NCDC), the National Weather Service, and/or other such sources. The data can be provided by one or more resources for redundancy purposes. The software can consider exact weather data of a specific location by collecting data from an on-site weather station and/or sky-imager. By collecting from local sensor devices (see, e.g., FIG. 19) and issuing a forecast generation signal that can be used to control power output, the system full package can be considered as a Cyber-Physical System integration. The primary objective of the system can be to forecast the generation of energy in real time. The energy generation and consumption should be synchronized in order to maintain the balance between the generation and consumption. Using forecast energy generation more advanced control mechanisms are enabled.

The software can predicts the energy generation for the long term and for the short term. The long term generation can include, for example, a 7-day ahead generation forecast. The day ahead gives a clear idea of the amount of energy that would be generated the next day and therefore gives the utility an idea of how much energy can be taken from the renewable energy system resources. An important aspect of the software is to maximize the use of the energy generated from solar panels (e.g., from a solar power plant having solar panels). In order to maximize this, the software can predict how much generation is going to come from the solar panels such that extra energy produced by a conventional source of energy will not be unnecessarily purchased (e.g., purchased by a utility company if the solar panels are part of a solar power plant). The software also performs short term forecasting to reduce the uncertainty that solar production places on bulk power system operations.

In the short term forecasting the system can predict the generation for one or more short periods of time (e.g., the next hour, 15-minutes ahead, and/or 5-minutes) by using different weather features. A primary reason for predicting 15-minutes ahead and 5-minutes ahead after predicting an hour ahead is that weather conditions are very random and change very frequently. If some amount of energy is predicted, it may differ in actual production; to minimize the error, window size for the prediction can be reduced.

Systems of embodiments can be designed as cloud compatible services that can be configured to run as a service to which many different clients can connect. The prediction service can be automatically improved with online learning, and the initial model training can optionally be performed with historical data. Energy management applications can use the web service API to implement PV-generation forecasts into their algorithms. The software can make forecasts based on real world PV systems (e.g., systems of high power such as 1.4 megawatts (MW)). It can function as a powerful forecasting application for utility scale PV.

Embodiments can use a machine learning model. A machine learning approach can be used to help capture the chaotic behavior of PV-generation under variable weather conditions. A machine learning model can utilize a full capture of weather observations in different data formats. For example, the system can capture local weather parameters (e.g., including wind speed, wind direction, ambient temperature, precipitation, humidity, atmosphere turbidity, and/or atmosphere translucency) as numeric values. Image data of sky imaging cameras can be used to build a model of the visual obfuscation of the sun by clouds. Utilizing two sky imaging cameras a cloud height can be deduced from computer vision processing methods. Cloud base height and shape provide shading profiles. A geo-satellite feed (e.g., at 5 minute intervals from a short time (e.g., 6 minutes) in the past) can be collected (e.g., from the National Oceanic and Atmospheric Administration (NOAA)). The satellite images may have a limited resolution, which would be limiting to their ability for use in cloud coverage estimation over a PV system. Even in this case they can provide information on anticipated time of arrival of larger storm systems over the PV system.

Figure 20:
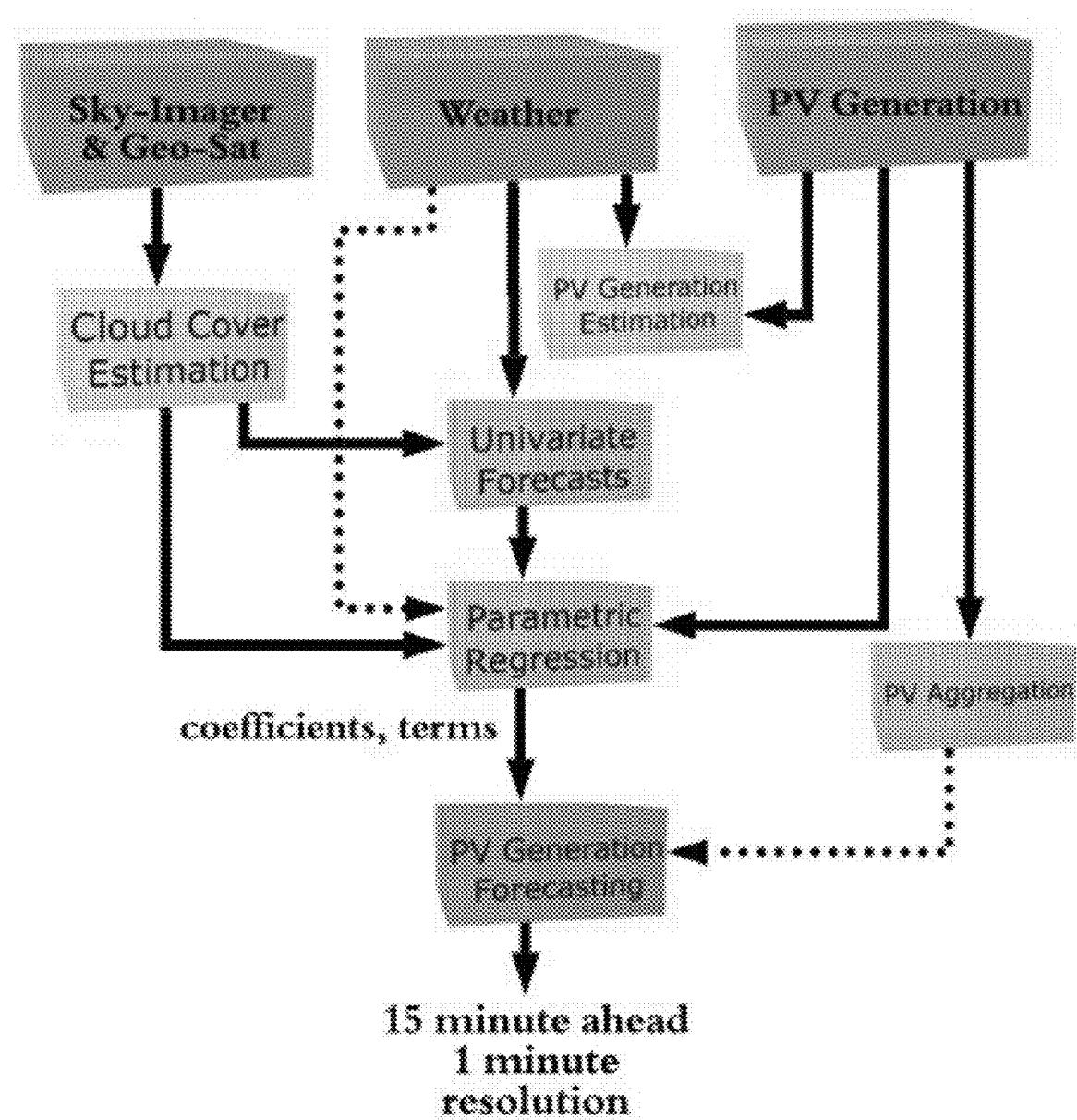
FIG. 20 shows a block diagram of a forecasting model, according to an embodiment of the subject invention.

Sundararajan et al. ("Roadmap to prepare distribution grid-tied photovoltaic site data for performance monitoring," in 2017 International Conference on Big Data, IoT and Data Science (BID), December 2017, pp. 110-115; which is hereby incorporated by reference herein in its entirety) provides a general approach for designing a data analytic application framework for distributed PV systems. Drawing on this approach, embodiments can utilize a comprehensive machine learning pipeline for computing with the real data and running comparisons of distributions of forecast and actual observations. FIG. 20 shows a block diagram of a forecasting model, according to an embodiment of the subject invention. Referring to FIG. 20, the diagram shows how data enters the system and the transformations used to generate the forecast value. Initially, data are collected and there are multiple different sources of data that must be accounted for. Proper handling of the capture of data from these sources (the top three boxes in FIG. 20) is an important task and involves some configuration variability depending on the existing infrastructure at the PV system (e.g., the source of the PV generation data can vary depending on which vendor or method is used to gather the PV generation data). PV generation estimation is done immediately for observations at the present time, and this is for evaluation of the estimator. In order to create the forecast, multiple inputs are required. In the forecasting process the input parameters for weather are derived from univariate regression. In order to develop a cloud shading profile, cloud cover estimation is processed using the cloud image data with a computer vision and convolutional-time-dependent neural network approach.

In order to forecast on other input parameters, a series of parametric regression models can provide linear equations that can be used to create a series of predictions for particular variables, including the module temperature. PV aggregation is another conditional parameter that includes the aggregation of PV generation from multiple systems that run the method of embodiments of the subject invention. Fleet aggregation of PV systems can reduce intermittency of generation. Cloud cover estimation data from imaging and computer vision processing can be combined with the univariate forecasts of module temperature, and parametric regression can be used to derive coefficients and terms for the PV generation forecasting model.

Algorithm 3 shows a process for forecasting PV generation that can be used with systems and methods of embodiments of the subject invention. Requirements can include the data source initialization, client initialization, the compiled weather parameters, and the estimator initialization. From there the main loop, not shown, can continue to run the generation estimation process over the time interval target. The generator can yield its results to the main program, which can pass the forecast generation signal forward, as requested by the developer (e.g., to a graphical interface, such as a graphical user interface (GUI)).

Figure 21:
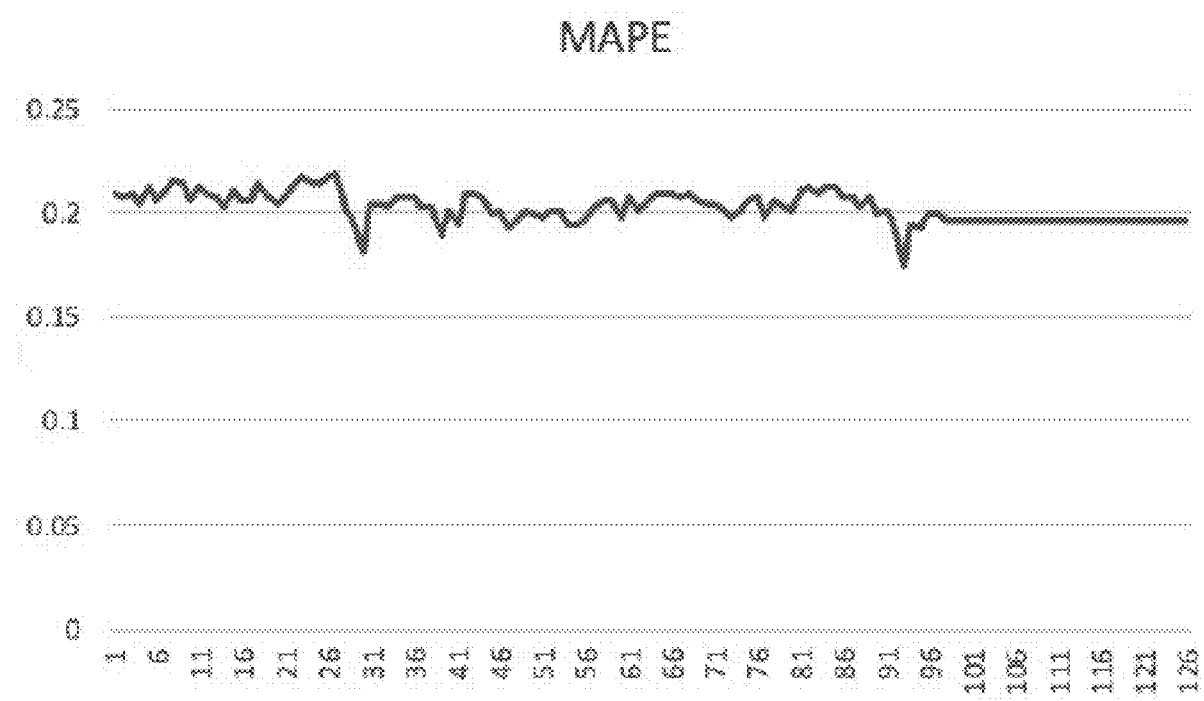
FIG. 21 shows a plot of mean absolute percentage error (MAPE) for forecasting, obtained by a method of an embodiment of the subject invention.

Algorithm 4 shows an algorithm that can be started by Algorithm 3 when the forecasted input parameters are requested. In Algorithm 4 the ideal irradiance, derate factors, and weather factors can all be considered in a system input forecasting method. The solar variables can be used in determining ideal irradiance, and then irradiance forecast can be modified in a subtractive way by considering the impact of the atmospheric conditions. The system was tested on a local site using 127 data points on Nov. 26, 2019, and the mean absolute percentage error (MAPE) is shown in FIG. 21. The results show that the forecasting model performed consistently.

Embodiments of the subject invention improve reliable output from PV systems and the reliability of the power grid under high penetration PV integration into the power grid, by providing a generation forecasting application for PV panels (e.g., PV panels of power plants). The holistic model can be used on a large capacity/power source, such as a power plant (e.g., a 1.4 MW DC PV power plant). The data driven forecasting requires many inputs of data to operate at a high information level. Such data include imaging data of the atmosphere from site based sky-imaging devices, and geo-stationary satellite data (e.g., satellite data provided by NOAA). The model captures a wide range of input parameters, and using a thorough approach a consistent forecast performance is possible. Well-known static conditions are easily captured, such as the sun position and ideal irradiance, while more difficult variables can be handled by local weather detection devices that generate image time-series recordings and/or numerical time-series recordings.

---
Algorithm 3 Forecast PV Generation
---
Data sources initialization
Client Initialization
weatherConditions := Compile Weather parameters
G = Estimator initialization
predictions :=
for t in time intervals do
| irradiance := loadFromProgramMemory
| yield G(weatherConditions, derateFactors,
| irradiance)
| weatherConditions := getWeatherUpdate( )
end ---
Algorithm 4 Forecasts for Input Series:
Generator (G) for Forecast Input
---
module Parameters := readSite Config('module')
irrc := irradianceCalculator( )
module := module (moduleTemperatureObservations, moduleParameters)
for t in time intervals do
| solarVariables :=
| (getSolarElevation (t), getSolarAngle(t))
| irradiance := irrc.getIrradiance(solarVariables, t)
| irradiance := idealIrradiance( )
| irradiance := adjustedIrradiance(irradiance, weatherConditions)
| mod.temp :=
| regress or(moduleTemperatureObservations)
| storeData(irradiance, mod.temp)
end The methods and processes described herein can be embodied as code and/or data. The software code and data described herein can be stored on one or more machine-readable media (e.g., computer-readable media), which may include any device or medium that can store code and/or data for use by a computer system. When a computer system and/or processor reads and executes the code and/or data stored on a computer-readable medium, the computer system and/or processor performs the methods and processes embodied as data structures and code stored within the computer-readable storage medium.

It should be appreciated by those skilled in the art that computer-readable media include removable and non-removable structures/devices that can be used for storage of information, such as computer-readable instructions, data structures, program modules, and other data used by a computing system/environment. A computer-readable medium includes, but is not limited to, volatile memory such as random access memories (RAM, DRAM, SRAM); and non-volatile memory such as flash memory, various read-only-memories (ROM, PROM, EPROM, EEPROM), magnetic and ferromagnetic/ferroelectric memories (MRAM, FeRAM), and magnetic and optical storage devices (hard drives, magnetic tape, CDs, DVDs); network devices; or other media now known or later developed that are capable of storing computer-readable information/data. Computer-readable media and machine-readable media should not be construed or interpreted to include any propagating signals. A computer-readable medium of the subject invention can be, for example, a compact disc (CD), digital video disc (DVD), flash memory device, volatile memory, or a hard disk drive (HDD), such as an external HDD or the HDD of a computing device, though embodiments are not limited thereto. A computing device can be, for example, a laptop computer, desktop computer, server, cell phone, or tablet, though embodiments are not limited thereto.

It should be understood that the examples and embodiments described herein are for illustrative purposes only and that various modifications or changes in light thereof will be suggested to persons skilled in the art and are to be included within the spirit and purview of this application.

All patents, patent applications, provisional applications, and publications referred to or cited herein are incorporated by reference in their entirety, including all figures and tables, to the extent they are not inconsistent with the explicit teachings of this specification.

What is claimed is:

1. A system for forecasting renewable energy generation, the system comprising:
    a renewable energy source;
    at least one first sensor on the renewable energy source;
    a processor; and
    a non-transitory machine-readable medium in operable communication with the processor and having instructions stored thereon that, when executed by the processor, perform the following steps:
        receiving energy data on current energy generation from the at least one first sensor on the renewable energy source;
        receiving weather parameters of the local weather from second sensors;
        receiving image data of the sky from at least one imaging camera;
        estimating future energy generation based on the energy data and the weather parameters;
        estimating cloud cover based on the image data to derive a cloud shading profile;
        performing a univariate regression on the weather parameters and the cloud shading profile to derive input parameters;
        performing at least one parametric regression on the input parameters and the energy data and deriving a forecast of renewable energy generation of the renewable energy source; and
        providing the forecast of renewable energy generation to a power system having the renewable energy source such that the power system adjusts amounts of power obtained from the renewable energy source and another energy source in operable communication with the power system, thereby optimizing use of energy generated by the renewable energy source.

2. The system according to claim 1, the forecast of renewable energy generation comprising a 15-minute ahead prediction.

3. The system according to claim 1, the forecast of renewable energy generation comprising a 1-hour ahead prediction.

4. The system according to claim 1, the forecast of renewable energy generation comprising a 7-day ahead prediction.

5. The system according to claim 1, the renewable energy generation being photovoltaic (PV) energy generation.

6. The system according to claim 1, further comprising the at least one first sensor and the second sensors.

7. The system according to claim 1, the weather parameters comprising wind speed, wind direction ambient temperature, precipitation, atmosphere turbidity, and atmosphere translucency.

8. The system according to claim 1, the instructions when executed by the processor further receiving the image data from a geo-satellite feed.

9. The system according to claim 1, the estimating of the cloud cover based on the image data to derive the cloud shading profile comprising using a convolutional-time-dependent neural network to derive the cloud shading profile.

10. The system according to claim 1, the instructions when executed by the processor further receiving aggregation data and using the aggregation data when deriving the forecast of renewable energy generation.

11. A method for forecasting renewable energy generation, the method comprising:
   receiving, by a processor, energy data on current energy generation from at least one first sensor on a renewable energy source;
   receiving, by the processor, weather parameters of the local weather from second sensors;
   receiving, by the processor, image data of the sky from at least one imaging camera;
   estimating, by the processor, future energy generation based on the energy data and the weather parameters;
   estimating, by the processor, cloud cover based on the image data to derive a cloud shading profile;
   performing, by the processor, a univariate regression on the weather parameters and the cloud shading profile to derive input parameters;
   performing, by the processor, at least one parametric regression on the input parameters and the energy data and deriving a forecast of renewable energy generation of the renewable energy source; and
   providing the forecast of renewable energy generation to a power system having the renewable energy source such that the power system adjusts amounts of power obtained from the renewable energy source and another energy source in operable communication with the power system, thereby optimizing use of energy generated by the renewable energy source.

12. The method according to claim 11, the forecast of renewable energy generation comprising a 15-minute ahead prediction.

13. The method according to claim 11, the forecast of renewable energy generation comprising a 1-hour ahead prediction.

14. The method according to claim 11, the forecast of renewable energy generation comprising a 7-day ahead prediction.

15. The method according to claim 11, the renewable energy generation being photovoltaic (PV) energy generation.

16. The method according to claim 11, the weather parameters comprising wind speed, wind direction ambient temperature, precipitation, atmosphere turbidity, and atmosphere translucency.

17. The method according to claim 11, further comprising receiving the image data from a geo-satellite feed.

18. The method according to claim 11, the estimating of the cloud cover based on the image data to derive the cloud shading profile comprising using a convolutional-time-dependent neural network to derive the cloud shading profile.

19. The method according to claim 11, further comprising receiving aggregation data and using the aggregation data when deriving the forecast of renewable energy generation.

20. A system for forecasting renewable energy generation, the system comprising:
   a renewable energy source;
   at least one first sensor on the renewable energy source;
   a plurality of second sensors;
   a processor; and
   a non-transitory machine-readable medium in operable communication with the processor, the at least one first sensor, and the plurality of second sensors, the machine-readable medium having instructions stored thereon that, when executed by the processor, perform the following steps:
      receiving energy data on current energy generation from the at least one first sensor on the renewable energy source;
      receiving weather parameters of the local weather from the plurality of second sensors;
      receiving image data of the sky from at least one imaging camera and a geo-satellite feed;
      receiving aggregation data from the at least one first sensor;
      estimating future energy generation based on the energy data and the weather parameters;
      estimating cloud cover based on the image data to derive a cloud shading profile;
      performing a univariate regression on the weather parameters and the cloud shading profile to derive input parameters;
      performing at least one parametric regression on the input parameters and the energy data and deriving a forecast of renewable energy generation of the renewable energy source; and
      providing the forecast of renewable energy generation to a power system having the renewable energy source such that the power system adjusts amounts of power obtained from the renewable energy source and another energy source in operable communication with the power system, thereby optimizing use of energy generated by the renewable energy source,
   the forecast of renewable energy generation comprising a 15-minute ahead prediction, a 1-hour ahead prediction, and a 7-day ahead prediction,
   the renewable energy generation being photovoltaic (PV) energy generation,
   the weather parameters comprising wind speed, wind direction ambient temperature, precipitation, atmosphere turbidity, and atmosphere translucency, and
   the estimating of the cloud cover based on the image data to derive the cloud shading profile comprising using a convolutional-time-dependent neural network to derive the cloud shading profile,
   the aggregation data being used when the forecast of renewable energy generation is derived.

* * * * *

UNITED STATES PATENT AND TRADEMARK OFFICE
CERTIFICATE OF CORRECTION

PATENT NO. : 11,022,720 B2  
APPLICATION NO. : 16/882010  
DATED : June 1, 2021  
INVENTOR(S) : Sarwat et al.

Page 1 of 1

It is certified that error appears in the above-identified patent and that said Letters Patent is hereby corrected as shown below:

On the Title Page

Item (73) "Assignee: The Florid International University Board of Trustees" should read --Assignee: The Florida International University Board of Trustees--.

Signed and Sealed this  
Twenty-fifth Day of January, 2022

Drew Hirshfeld  
*Performing the Functions and Duties of the  
Under Secretary of Commerce for Intellectual Property and  
Director of the United States Patent and Trademark Office*